US009346421B2

(12) United States Patent
Miyashiro

(10) Patent No.: US 9,346,421 B2
(45) Date of Patent: May 24, 2016

(54) SADDLE-TYPE ELECTRIC VEHICLE

(71) Applicant: Yamaha Hatsudoki Kabushiki Kaisha, Iwata-shi, Shizuoka (JP)

(72) Inventor: Shidehiko Miyashiro, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/533,489

(22) Filed: Nov. 5, 2014

(65) Prior Publication Data

US 2015/0122562 A1 May 7, 2015

(30) Foreign Application Priority Data

Nov. 6, 2013 (JP) ................. 2013-230705

(51) Int. Cl.
*B60R 16/04* (2006.01)
*B62D 61/02* (2006.01)
(Continued)

(52) U.S. Cl.
CPC ............... *B60R 16/0215* (2013.01); *B60K 1/04* (2013.01); *B60L 11/1822* (2013.01); *B60L 11/1874* (2013.01); *B60L 11/1877* (2013.01); *B60L 11/1879* (2013.01); *B62M 6/90* (2013.01); *H01M 2/1005* (2013.01); *H01M 2/1083* (2013.01); *B60K 2001/0466* (2013.01); *B60L 2200/12* (2013.01); *B60L 2240/545* (2013.01); *B60L 2240/547* (2013.01); *B62K 2204/00* (2013.01); *H01M 2/08* (2013.01);
(Continued)

(58) Field of Classification Search
CPC ............... B60R 16/04; B62K 2202/00; B60K 2001/045; B60K 2001/04; B60K 2001/0405; B60K 2001/0433; B60K 2001/0416; H01M 2/1083
USPC .......................................... 180/216, 220, 68.5
See application file for complete search history.

(56) References Cited

U.S. PATENT DOCUMENTS

| 5,477,936 A | 12/1995 | Sugioka et al. |
| 5,567,542 A | 10/1996 | Bae |

(Continued)

FOREIGN PATENT DOCUMENTS

| EP | 2 280 436 A2 | 2/2011 |
| EP | 2595216 A1 | 5/2013 |

(Continued)

OTHER PUBLICATIONS

Miyashiro; "Saddle-Type Electric Vehicle"; U.S. Appl. No. 14/533,485, filed Nov. 5, 2014.

(Continued)

*Primary Examiner* — Joseph Rocca
*Assistant Examiner* — Travis Coolman
(74) *Attorney, Agent, or Firm* — Keating and Bennett, LLP

(57) ABSTRACT

A vehicle includes a battery supported by an elastic member. The vehicle is provided with a connector that is electrically connected to a connector on the battery. The connector on the vehicle is switched between an unlock state in which the movement of the connector on the vehicle is allowed to follow the oscillation of the battery, and a lock state in which the movement of the connector on the vehicle is restricted. Accordingly, it is possible to prevent a stress from being applied to the connector on the battery and the connector on the vehicle when a vehicle is travelling, and it is possible to smoothly connect the connector on the battery and the connector on the vehicle when a user mounts the battery on the vehicle.

12 Claims, 22 Drawing Sheets

(51) Int. Cl.
- *B60R 16/02* (2006.01)
- *B60K 1/04* (2006.01)
- *B62M 6/90* (2010.01)
- *B60L 11/18* (2006.01)
- *H01M 2/10* (2006.01)
- *H01M 2/08* (2006.01)
- *H01M 10/42* (2006.01)
- *H01M 10/48* (2006.01)

(52) U.S. Cl.
CPC ........ *H01M 10/4257* (2013.01); *H01M 10/482* (2013.01); *H01M 2010/4278* (2013.01); *Y02T 10/7005* (2013.01); *Y02T 10/705* (2013.01); *Y02T 10/7072* (2013.01); *Y02T 90/124* (2013.01); *Y02T 90/14* (2013.01)

(56) References Cited

U.S. PATENT DOCUMENTS

| | | | |
|---|---|---|---|
| 5,633,095 A | 5/1997 | Ishikawa et al. | |
| 5,681,668 A | 10/1997 | Reed et al. | |
| 6,186,256 B1* | 2/2001 | Dignitti | 180/68.5 |
| 7,117,966 B2 | 10/2006 | Kohda et al. | |
| 7,604,078 B2* | 10/2009 | Okamoto et al. | 180/206.1 |
| 7,926,608 B2 | 4/2011 | Horii et al. | |
| 8,011,462 B2* | 9/2011 | Davies | B60L 11/1822 180/65.21 |
| 8,097,359 B2* | 1/2012 | Gau et al. | 429/187 |
| 8,596,401 B2 | 12/2013 | Ishikawa et al. | |
| 8,653,786 B2* | 2/2014 | Baetica et al. | 320/104 |
| 8,789,639 B2 | 7/2014 | Mimura | |
| 9,061,714 B1* | 6/2015 | Albery et al. | |
| 2005/0177285 A1 | 8/2005 | Honda | |
| 2005/0217910 A1 | 10/2005 | Yonehana et al. | |
| 2008/0314660 A1* | 12/2008 | Davies | B60L 11/1822 180/65.31 |
| 2010/0015513 A1 | 1/2010 | Nakahama et al. | |
| 2010/0018787 A1 | 1/2010 | Plazotta et al. | |
| 2012/0103716 A1 | 5/2012 | Fujihara et al. | |
| 2012/0234615 A1 | 9/2012 | Takamura et al. | |
| 2013/0136975 A1* | 5/2013 | Uchida | 429/159 |
| 2013/0175102 A1 | 7/2013 | Tsukamoto et al. | |
| 2013/0207460 A1 | 8/2013 | Kawatani et al. | |
| 2013/0216869 A1 | 8/2013 | Kawatani et al. | |
| 2013/0216883 A1 | 8/2013 | Kawatani et al. | |
| 2013/0216885 A1 | 8/2013 | Kawatani et al. | |
| 2013/0233631 A1* | 9/2013 | Jauvtis | 180/206.4 |
| 2013/0233633 A1 | 9/2013 | Matsuda | |
| 2013/0264134 A1* | 10/2013 | Matsuda | 180/68.1 |
| 2013/0270038 A1 | 10/2013 | Nitta | |
| 2014/0262568 A1* | 9/2014 | Matsuda | B62K 11/04 180/65.1 |
| 2014/0272517 A1 | 9/2014 | Glasgow et al. | |
| 2014/0292075 A1* | 10/2014 | Matsuda | B62K 11/04 307/9.1 |
| 2014/0319907 A1* | 10/2014 | Yamazaki | 307/9.1 |
| 2015/0122563 A1 | 5/2015 | Kondo et al. | |

FOREIGN PATENT DOCUMENTS

| | | |
|---|---|---|
| EP | 2 612 805 A1 | 7/2013 |
| EP | 2 623 404 A1 | 8/2013 |
| GB | 2 422 717 A | 8/2006 |
| JP | 4-257784 A | 9/1992 |
| JP | 9-11759 A | 1/1997 |
| JP | 10-53178 A | 2/1998 |
| JP | 10-119853 A | 5/1998 |
| JP | 2001-114157 A | 4/2001 |
| JP | 2010-018270 A | 1/2010 |
| JP | 2010-36791 A | 2/2010 |
| JP | 2013-163399 A | 8/2013 |
| WO | 2012/066598 A1 | 5/2012 |
| WO | 2012/070220 A1 | 5/2012 |
| WO | 2013/061387 A1 | 5/2013 |

OTHER PUBLICATIONS

Miyashiro; "Saddle-Type Electric Vehicle"; U.S. Appl. No. 14/533,482, filed Nov. 5, 2014.

Kondo et al.; "Battery and Saddle-Type Electric Vehicle Equipped Therewith"; U.S. Appl. No. 14/533,491, filed Nov. 5, 2014.

English translation of Official Communication issued in International Application PCT/JP2014/079402, mailed on Jan. 20, 2015.

\* cited by examiner

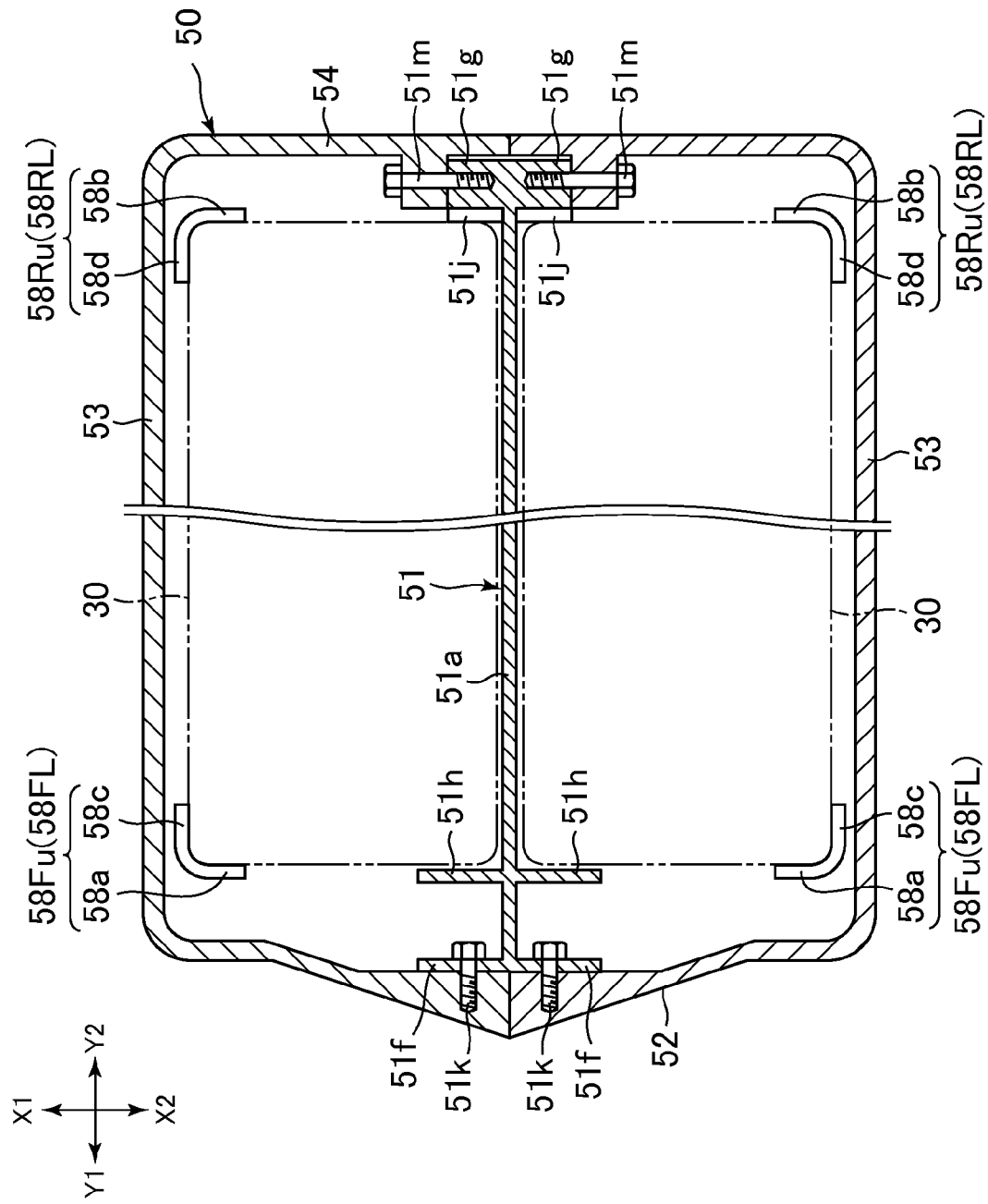

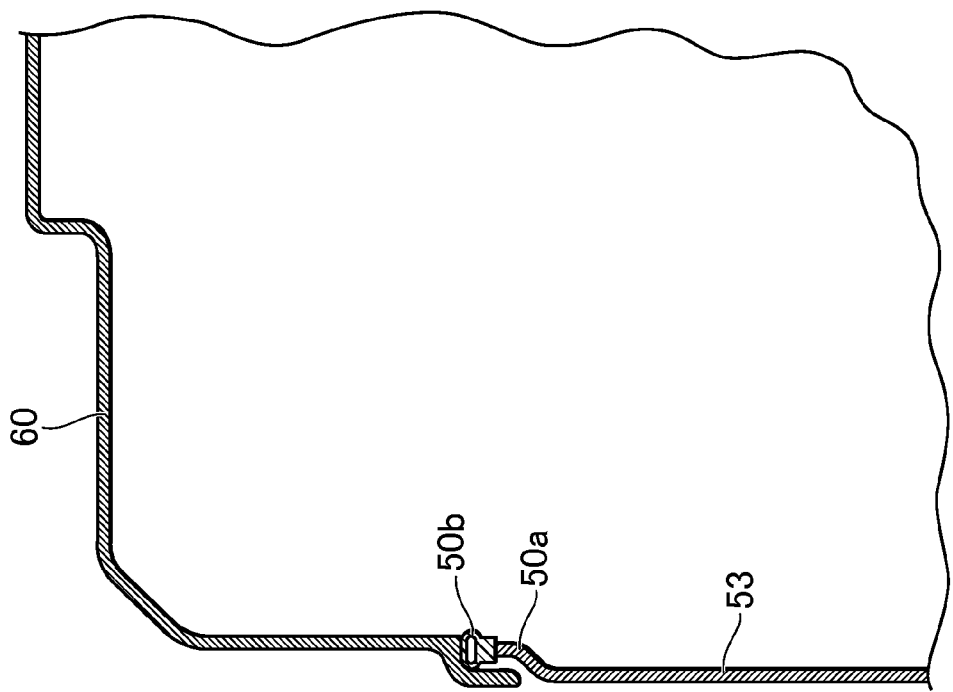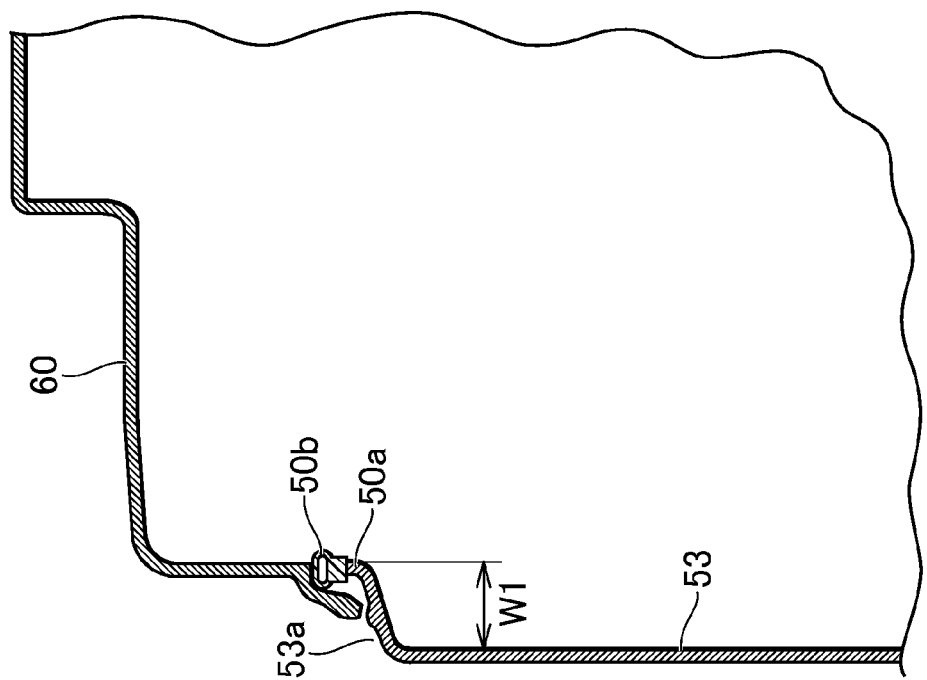

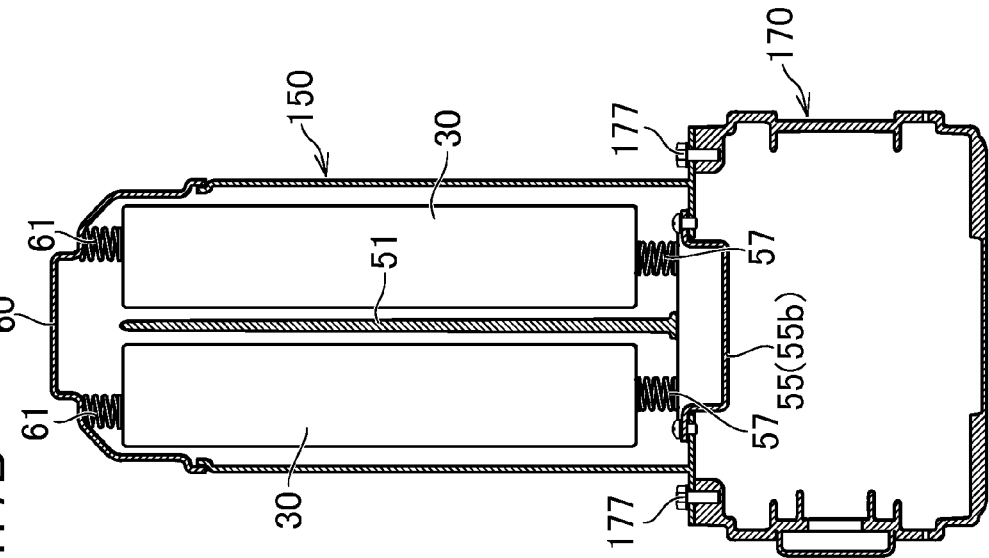
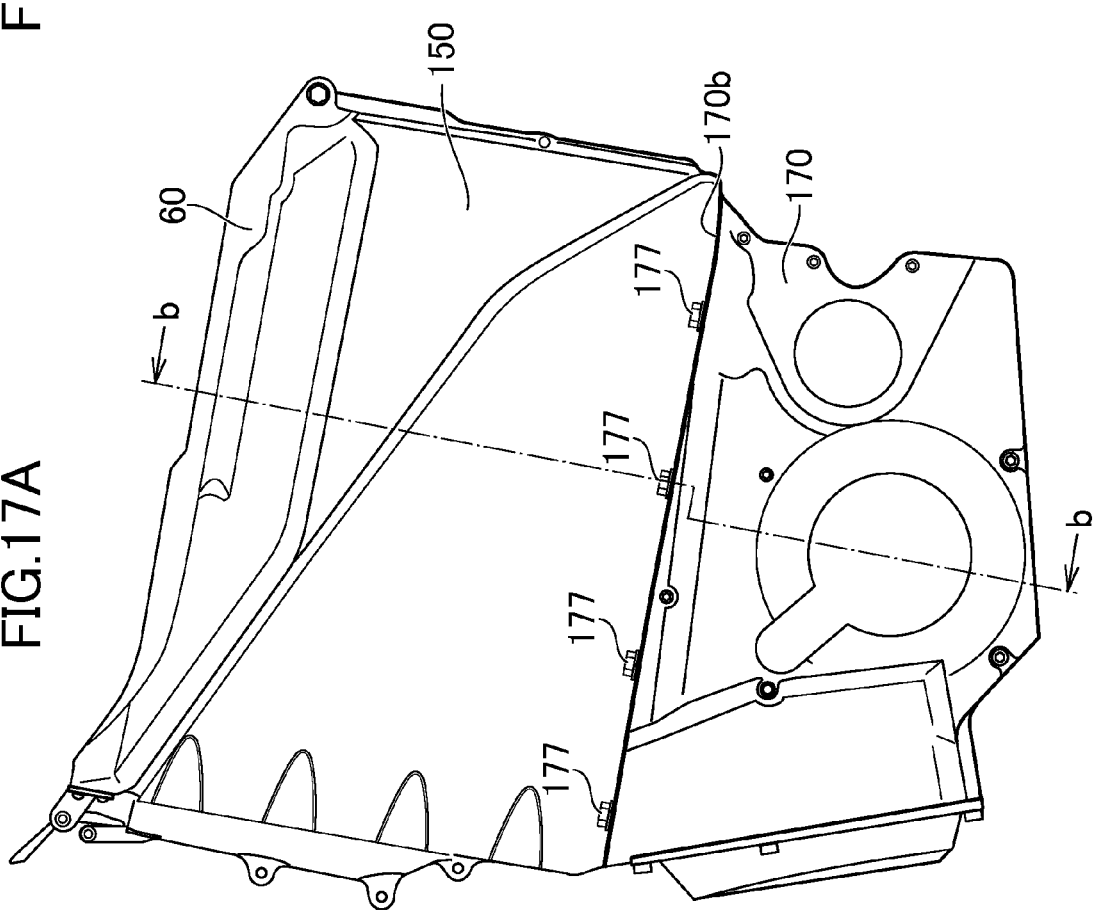

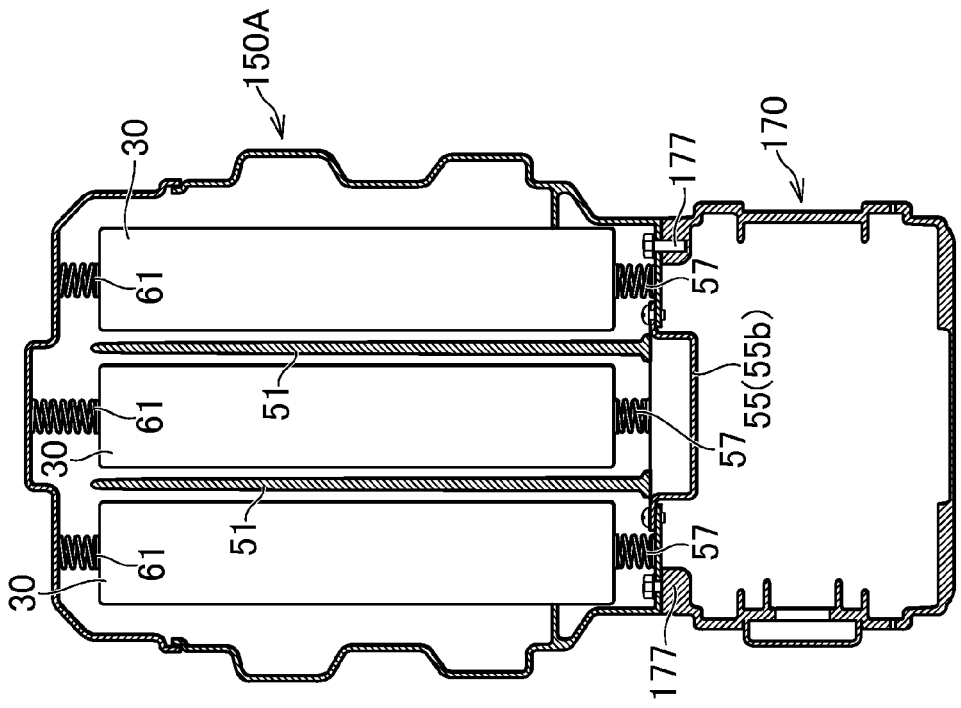
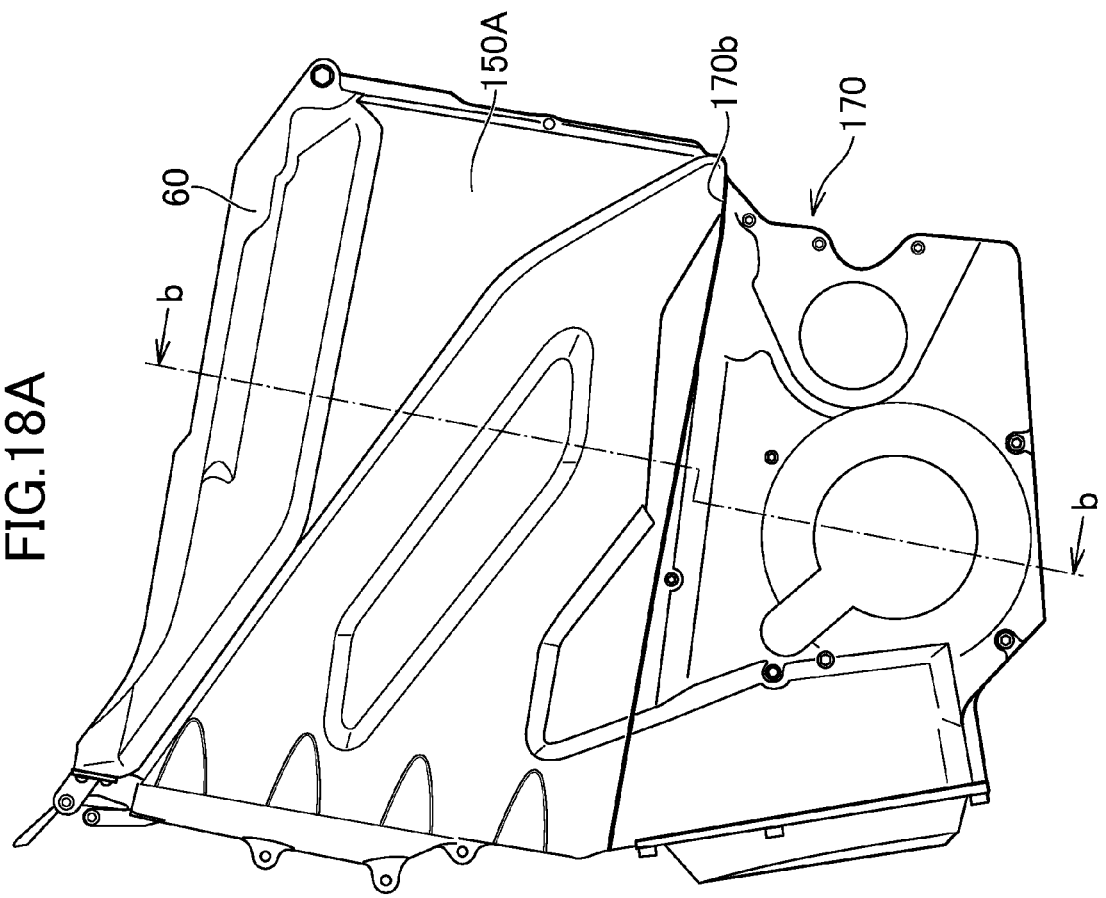
FIG.18A
FIG.18B

SADDLE-TYPE ELECTRIC VEHICLE

CROSS-REFERENCE TO RELATED APPLICATION

The present application claims priority from Japanese application JP2013-230705 filed on Nov. 6, 2013, the entire contents of which are hereby incorporated by reference into this application.

BACKGROUND OF THE INVENTION

1. Field of the Invention

The present invention relates to a saddle-type electric vehicle equipped with a battery that supplies electrical power to an electric motor and is configured to be attached to, and detached from, the vehicle, particularly, to a technology by which a connector of the battery and a connector provided in the vehicle are appropriately connected to each other.

2. Description of the Related Art

The development of a saddle-type electric vehicle has made progress, in which a rear wheel that is a drive wheel is driven by an electric motor. JP 2010-18270 A discloses an electric two-wheel vehicle as an example of the saddle-type electric vehicle. The vehicle disclosed in JP 2010-18270 A includes a configuration in which a battery to supply electrical power to the electric motor can be detached from a vehicle body for the charging thereof. When the battery is mounted on the vehicle body, a connector (for example, a receptacle connector) of the battery is electrically connected to a connector (for example, a plug connector) provided in the vehicle body.

SUMMARY OF THE INVENTION

A structure is considered in which the battery is supported via an elastic member so as to reduce impacts that are applied to the battery due to the oscillations of the vehicle while the vehicle is travelling. In this structure, when the vehicle oscillates, the battery oscillates slightly as well. When the connector on the vehicle is fixed, and the battery oscillates, a stress is applied to the terminals of the connector of the battery and the terminals of the connector on the vehicle.

Preferred embodiments of the present invention provide saddle-type electric vehicles that prevent a stress from being applied to a connector on a battery and a connector on a vehicle while a vehicle is travelling, and smoothly connect the connector on the battery and the connector on the vehicle when a user mounts the battery on the vehicle.

According to a preferred embodiment of the present invention, a saddle-type electric vehicle includes an electric motor configured to drive a drive wheel; a battery configured to be attached to, and detached from, a vehicle, and to supply electrical power to the electric motor; a connector on the battery; an elastic member provided on the vehicle and configured to support the battery; and a connector on the vehicle configured to be electrically connected to the connector on the battery. The connector on the vehicle is configured to be switched between an unlock state in which movement of the connector on the vehicle follows oscillations of the battery, and a lock state in which the movement of the connector on the vehicle is restricted or prevented.

According to a preferred embodiment of the present invention, it is possible to prevent a stress from being applied between the terminals of the connector on the vehicle and the terminals of the connector on the battery, specifically, the wear of the terminals by bringing the connectors into the unlock state while the vehicle is travelling. It is possible to smoothly connect the connector on the vehicle and the connector on the battery by bringing the connector on the vehicle into the lock state when a user mounts the battery on the vehicle.

A saddle-type electric vehicle according to a preferred embodiment of the present invention preferably further includes a user-operable operation member configured to switch the state of the connector on the vehicle between the unlock state and the lock state. Accordingly, it is possible to switch the state of the connector on the vehicle upon the intention of the user.

In a saddle-type electric vehicle according to a preferred embodiment of the present invention, the operation member is preferably configured to move between a first position and a second position. The saddle-type electric vehicle is preferably provided with a transmission mechanism configured to transmit the movement of the operation member to the connector on the vehicle, to bring the connector on the vehicle into the unlock state when the operation member is located at the first position, and to bring the connector on the vehicle into the lock state when the operation member is located at the second position. Accordingly, since the movement of the operation member is mechanically transmitted to the connector, it is possible to switch the state of the connector on the vehicle with a simple structure compared to a structure in which the state of the connector is switched using an actuator.

In a saddle-type electric vehicle according to a preferred embodiment of the present invention, the transmission mechanism preferably includes a lock member configured to move between an engaging position at which the lock member engages with the connector on the vehicle and the connector on the vehicle is brought into the lock state, and a release position at which the lock member separates from the connector on the vehicle and the connector on the vehicle is brought into the unlock state. The operation member and the lock member are preferably connected to each other, the lock member is preferably disposed at the release position when the operation member is located at the first position, and the lock member is preferably disposed at the engaging position when the operation member is located at the second position. Accordingly, since the movement of the operation member is mechanically transmitted to the connector, it is possible to switch the state of the connector on the vehicle with a simple structure compared to a structure in which the state of the connector is switched using an actuator.

In a saddle-type electric vehicle according to a preferred embodiment of the present invention, the battery is preferably vertically attached to, and detached from, the vehicle. The vehicle preferably includes a battery accommodating portion that includes a bottom portion on which the battery is disposed. The elastic member and the connector on the vehicle are preferably provided in the bottom portion. Accordingly, it is possible to absorb the oscillations of the battery caused by the vertical movement of the vehicle using the elastic member.

In a saddle-type electric vehicle according to a preferred embodiment of the present invention, the operation member is preferably located higher than the battery. Accordingly, the user has easy access to the operation member.

In a saddle-type electric vehicle according to a preferred embodiment of the present invention, the operation member preferably includes a cover configured to cover the battery, and to be opened and closed. Accordingly, the user has easy access to the operation member, and it is possible to reduce the number of components.

In a saddle-type electric vehicle according to a preferred embodiment of the present invention, the first position of the operation member is preferably a closed position of the cover, and the second position of the operation member is preferably an open position of the cover. Accordingly, it is possible to bring the connector on the vehicle into the lock state when the user opens the cover.

In a saddle-type electric vehicle according to a preferred embodiment of the present invention, a plurality of batteries are preferably provided as the battery. A plurality of connectors are preferably provided as the connector on the vehicle, and are respectively connected to the connectors on the plurality of batteries. The transmission mechanism is preferably configured to limit the movement of the plurality of connectors provided on the vehicle when the operation member is located at the second position, and to allow the movement of the plurality of connectors provided on the vehicle when the operation member is located at the first position. Accordingly, since it is possible to switch the states of the plurality of connectors at once by operating the operation member, it is possible to improve work efficiency.

In a saddle-type electric vehicle according to a preferred embodiment of the present invention, the battery is preferably attached to, and detached from, the vehicle in a first direction. One of the connector on the vehicle and the connector on the battery preferably includes an engaging member configured to move between an engaging position at which the engaging member engages with the other of the connector on the vehicle and the connector on the battery so that the engaging member prevents the separation of the battery from the connector on the vehicle in the first direction, and a release position at which the engaging member releases the other of the connector on the vehicle and the connector on the battery so that the battery is allowed to separate from the connector on the vehicle in the first direction. Accordingly, it is possible to improve the stability of the connection between the connector on the vehicle and the connector on the battery.

In a saddle-type electric vehicle according to a preferred embodiment of the present invention, the engaging member is preferably provided to move while connected with an operation member that is configured to attach and detach the battery from the vehicle by an operator. Accordingly, it is possible to switch the state of the connector on the vehicle via a simple operation.

In a saddle-type electric vehicle according to a preferred embodiment of the present invention, the operation member is preferably a carrying handle of the battery. Accordingly, it is possible to switch the state of the connector on the vehicle via a simple operation.

The above and other elements, features, steps, characteristics and advantages of the present invention will become more apparent from the following detailed description of the preferred embodiments with reference to the attached drawings.

BRIEF DESCRIPTION OF THE DRAWINGS

In FIG. 5, a left case half body of the case is partially removed.

FIG. 6 is a cross-sectional view of the battery case illustrated in FIG. 5.

FIGS. 7A and 7B are cross-sectional views of a side wall portion of the battery case. FIG. 7A is a cross-sectional view taken along line VIIa-VIIa illustrated in FIG. 2. FIG. 7B is a cross-sectional view taken along line VIIb-VIIb illustrated in FIG. 2.

FIGS. 17A and 17B are views illustrating a modification example of the battery case and the motor case.

FIGS. 18A and 18B are views illustrating a modification example of the battery case and the motor case.

DETAILED DESCRIPTION OF THE PREFERRED EMBODIMENTS

Figure 1:
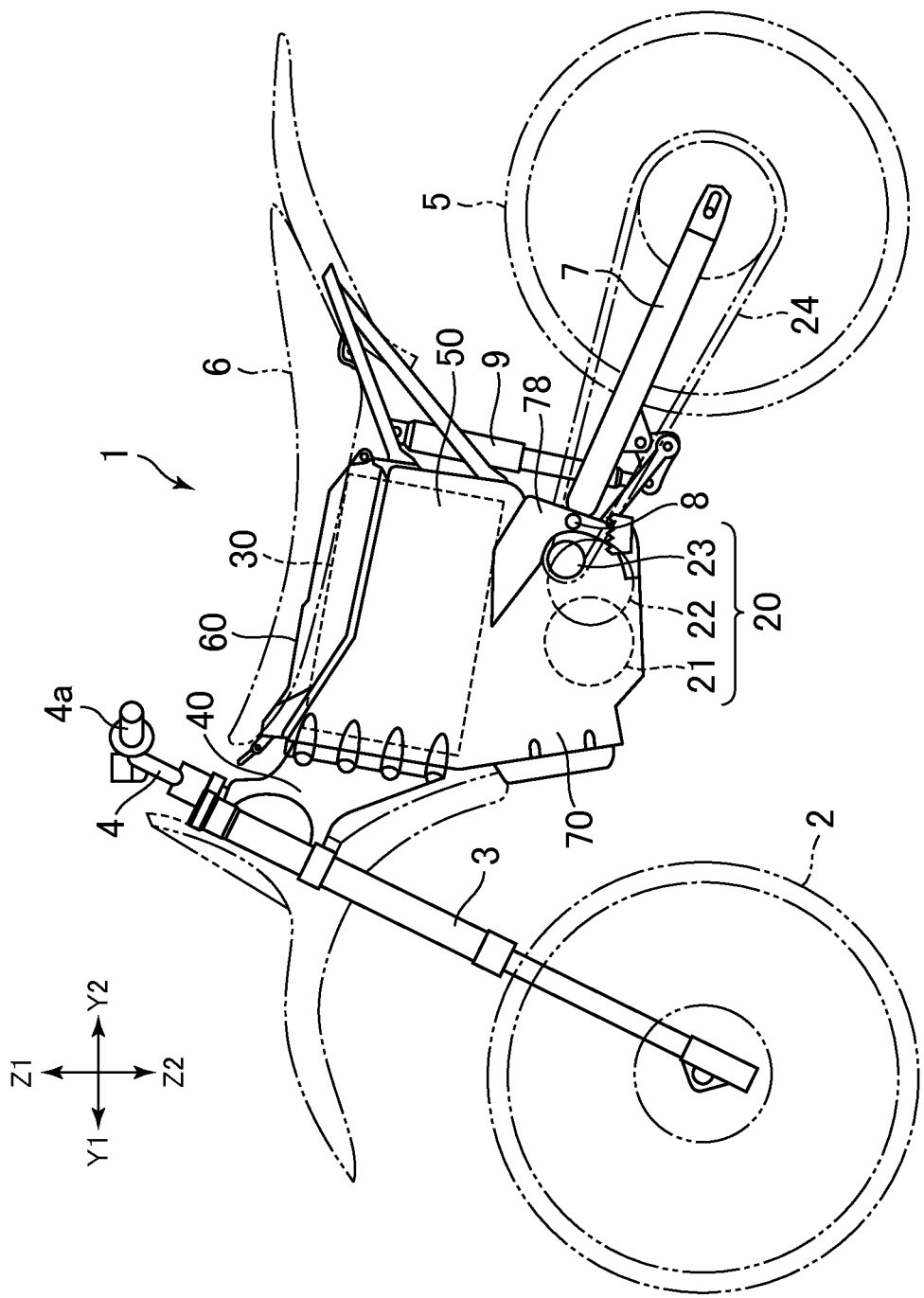
FIG. 1 is a side view of a saddle-type electric vehicle according to a preferred embodiment of the present invention.
Figure 2:
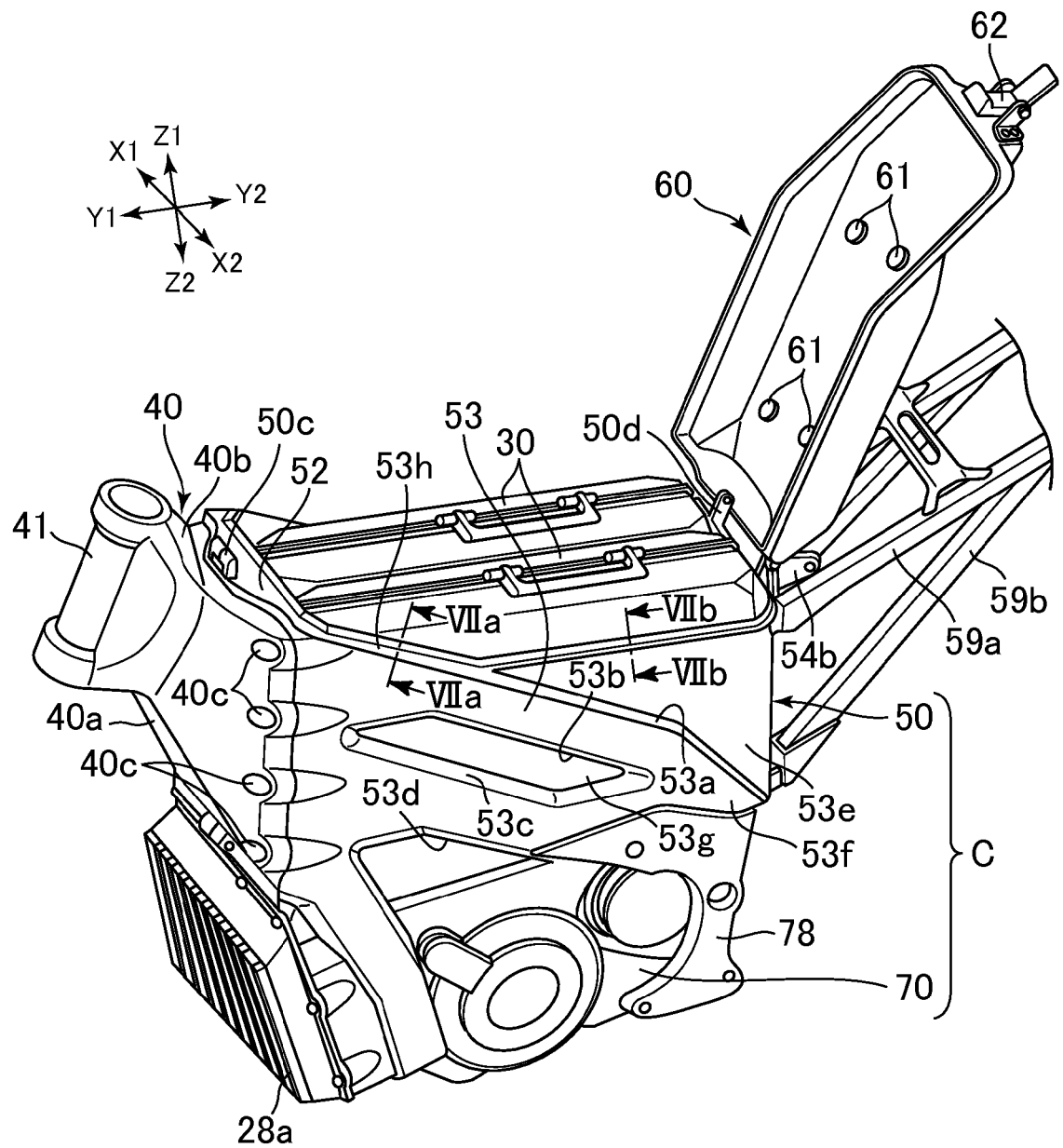
FIG. 2 is a perspective view illustrating a frame of the saddle-type electric vehicle.
Figure 3:
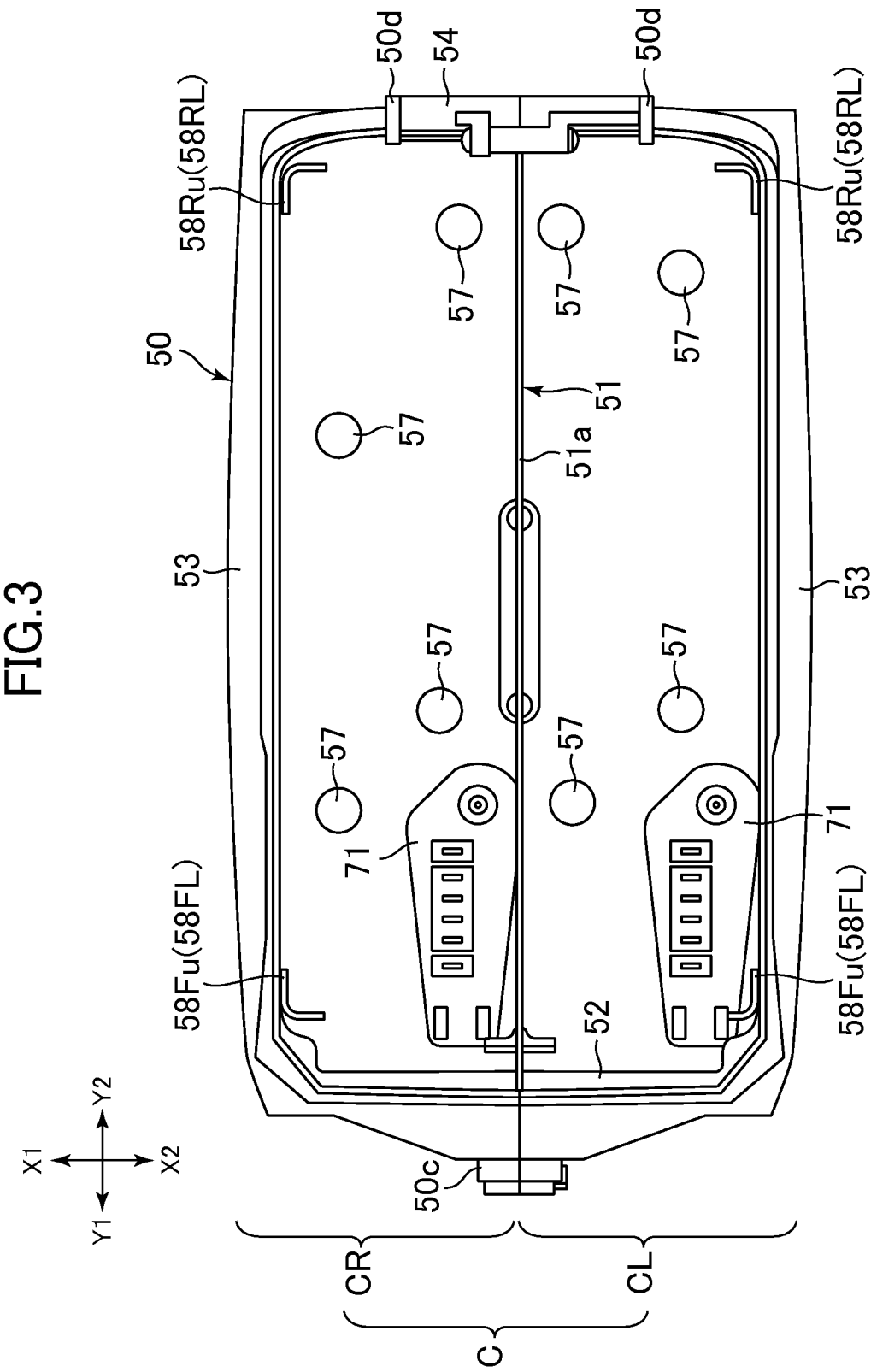
FIG. 3 is a plan view of a battery case of the frame.
Figure 4:
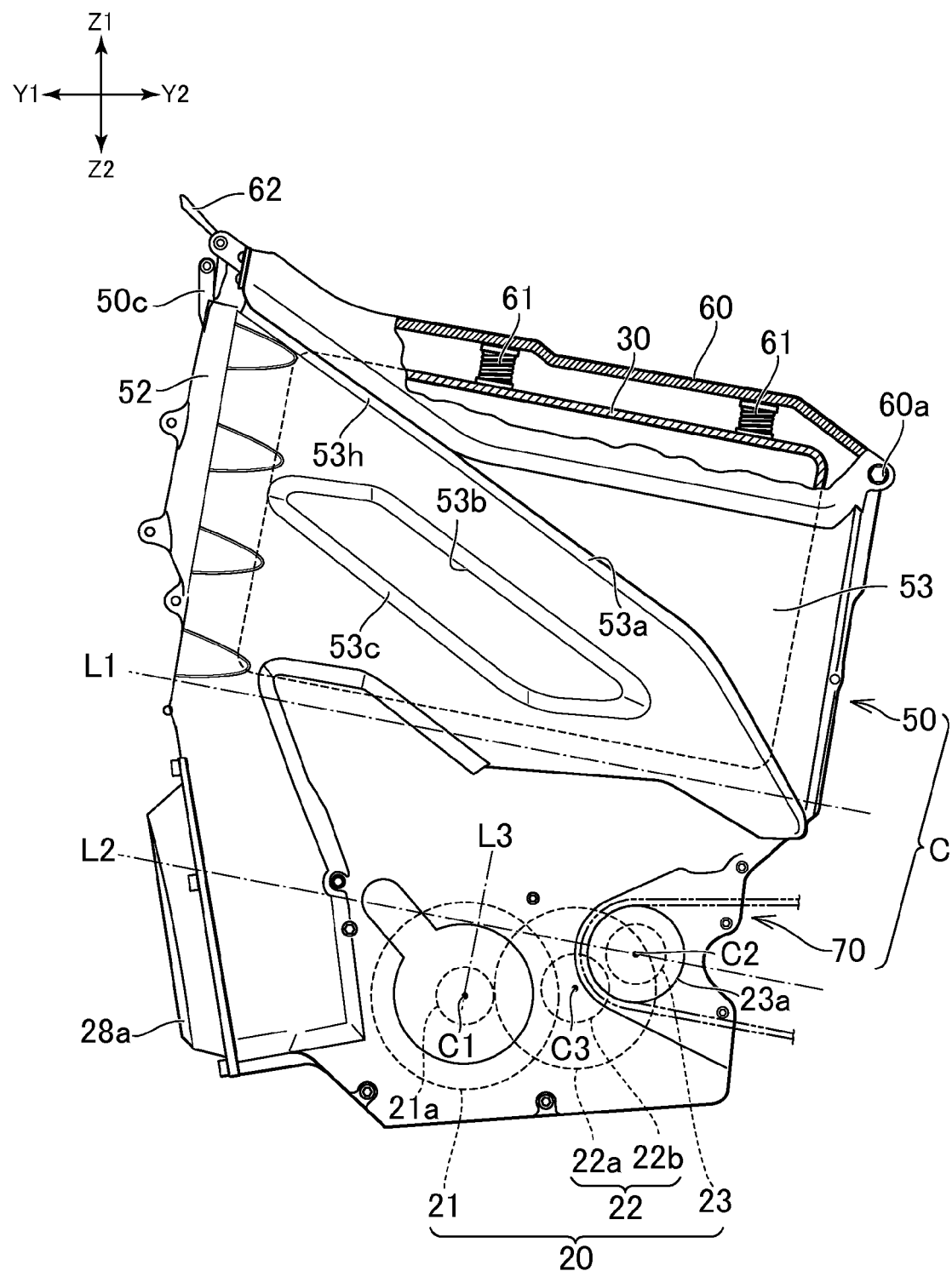
FIG. 4 is a side view of a case formed by the battery case and a motor case.
Figure 5:
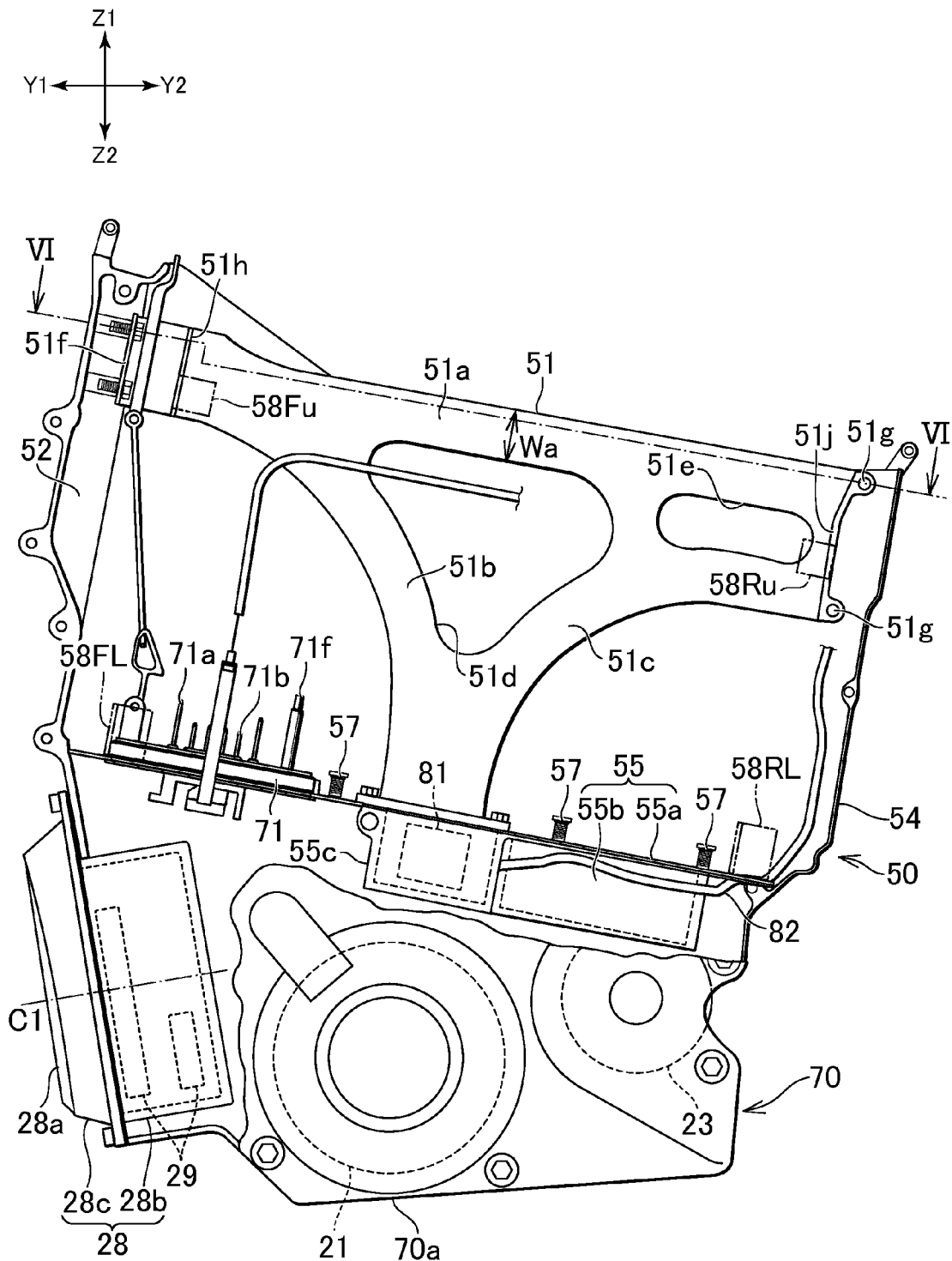
FIG. 5 is a side view illustrating an internal part of the case.

Hereinafter, a saddle-type electric vehicle and a battery equipped therein according to preferred embodiments of the present invention will be described. FIG. 1 is a side view of the saddle-type electric vehicle according to a preferred embodiment of the present invention. In this specification, an electric two-wheel vehicle 1 as an example of the saddle-type electric vehicle will be described. The saddle-type electric vehicle is not limited to an electric two-wheel vehicle, and may be a four-wheel all-terrain vehicle or recreational off-highway vehicle, for example. FIG. 2 is a perspective view illustrating a frame of the electric two-wheel vehicle 1. FIG. 3 is a plan view of a battery case 50 of the frame. FIG. 4 is a side view of a case C defined by the battery case 50 and a motor case 70 (to be described later). FIG. 5 is a side view illustrating an internal portion of the case C. In FIG. 5, a left case half body CL of the case C is partially removed.

In the following description, Y1 and Y2 illustrated in FIG. 1 indicate forward and rearward directions, respectively, and Z1 and Z2 indicate upward and downward directions, respectively. X1 and X2 illustrated in FIG. 3 indicate rightward and leftward directions, respectively.

As illustrated in FIG. 1, a front wheel 2 of the electric two-wheel vehicle 1 is supported by lower ends of a front fork 3. The front fork 3 can turn rightward and leftward about a steering shaft supported by a head pipe 41 (refer to FIG. 2) (to be described below). A handlebar 4 is attached to an upper portion of the front fork 3. Opposite end portions of the handlebar 4 are respectively provided with grips 4a. The right grip functions as an accelerator grip.

As illustrated in FIG. 1, a rear wheel 5 which is a drive wheel of the electric two-wheel vehicle 1 is supported by a rear arm 7. The rear arm 7 is supported by a pivot shaft 8 that is provided at a front end of the rear arm 7. The rear wheel 5 and the rear arm 7 can vertically move about the pivot shaft 8.

The electric two-wheel vehicle 1 includes a drive system 20 that includes an electric motor 21 configured to drive the rear wheel 5. The drive system 20 includes a speed reducer mechanism that reduces the rotation of the electric motor 21 and transmits the rotation to the output shaft 23. For example, the speed reducer mechanism includes a gear and a belt. As illustrated in FIG. 4, the speed reducer mechanism in the example described here includes a gear 22 that includes a large-diameter gear portion 22a that engages with a rotary shaft 21a of the electric motor 21 and a small-diameter gear portion 22b that engages with a gear of the output shaft 23. The drive system 20 is accommodated in the motor case 70 (to be described below). The output shaft 23 is provided with a rotating member 23a that is exposed laterally out of the motor case 70. For example, the rotating member 23a is a sprocket and a pulley. The rotation of the rotating member 23a is transmitted to the rear wheel 5 via a power transmission member 24 including a belt or a chain. The rotating member 23a is preferably a gear (for example, a bevel gear). In this case, the transmission member 24 is preferably a shaft.

The electric two-wheel vehicle 1 includes a battery 30 configured to supply electricity to the electric motor 21. The battery 30 is preferably a lithium ion battery, for example, but the type of the battery 30 is not limited to this example. The electric two-wheel vehicle 1 in the example illustrated here preferably includes a plurality of batteries 30. More specifically, the electric two-wheel vehicle 1 includes two batteries 30, for example (refer to FIG. 2). The number of batteries 30 is not limited to two, and for example, the electric two-wheel vehicle 1 may include three or four batteries 30. The batteries 30 can be attached to, and detached from, the vehicle body, and a user can detach the batteries 30 from the vehicle body and charge the batteries 30 with a battery charger.

As illustrated in FIG. 2, the electric two-wheel vehicle 1 includes the battery case 50 as a configuration member of a frame, and the batteries 30 are accommodated in the battery case 50. The battery case 50 in the example illustrated in FIG. 2 accommodates the plurality of batteries 30. The battery case 50 preferably has a box shape with an open top surface, and the batteries 30 can be vertically attached to, and detached from, the vehicle body. A case cover 60 is provided to cover the opening of the battery case 50. The size of the case cover 60 preferably corresponds to the opening of the battery case 50, and the battery case 50 is closed with the case cover 60.

As illustrated in FIG. 3, the battery case 50 includes a front wall portion 52 that defines a front surface of the battery case 50, side wall portions 53 that define right and left side surfaces thereof, and a rear wall portion 54 that defines a rear surface thereof. These wall portions 52, 53, and 54 surround the batteries 30. Accordingly, it is possible to effectively protect the batteries 30. The battery case 50 is preferably made of metal. For example, the material of the battery case 50 may be aluminum, iron, magnesium, or an alloy thereof. The battery case 50 includes a bottom portion 55 that supports a lower surface of each of the batteries 30 (refer to FIG. 5). The battery case 50 and the case cover 60 in the closed state define a box where all of a front surface, a rear surface, a top surface, a bottom surface, and right and left surfaces of the box are closed.

In the present example, the electric two-wheel vehicle 1 includes the case C including the battery case 50 and the motor case 70, and the case C includes a right case half body CR and a left case half body CL which are assembled together in a lateral direction of the vehicle (a direction of the vehicle width) (refer to FIG. 3). Each of the case half bodies CR and CL is an integral member. For example, the bottom portion 55 of the battery case 50 is a member that is separate from the case half bodies CR and CL. The bottom portion 55 is fixed to the case half bodies CR and CL with tightening members such as bolts or screws, for example. The structure of the battery case 50 is not limited to that in this example. For example, the bottom portion 55 may be integral with the case half bodies CR and CL.

As illustrated in FIG. 2, the battery case 50 is positioned to the rear of the head pipe 41 that supports the steering shaft. The head pipe 41 is connected to a front portion of the battery case 50. Accordingly, the battery case 50 can function as not only a member to accommodate the batteries 30, but also as a portion of the frame. As a result, it is possible to reduce the weight of the vehicle body, and reduce the vehicle width compared with the same in a structure where right and left frames are located on the right side and the left side of the battery case 50. In the present example, as illustrated in FIG. 2, the head pipe 41 is connected to the front wall portion 52 of the battery case 50. In addition, the head pipe 41 may be connected to a front portion of each of the side wall portions 53 of the battery case 50. Here, the structure in which "the head pipe 41 is connected to the battery case 50" includes not only a structure in which the head pipe 41 is attached to the battery case 50 with fasteners such as bolts, but also a structure in which the head pipe 41 is integral with the battery case 50.

As illustrated in FIG. 2, for example, the electric two-wheel vehicle 1 includes a foremost frame portion 40 that extends rearward from the head pipe 41 as a configuration member of the frame. The head pipe 41 in FIG. 2 is integral with the foremost frame portion 40. The foremost frame portion 40 is attached to the front portion of the battery case 50 with tightening members such as bolts, for example. By virtue of this structure, it is possible to use the battery case 50 which is common for a plurality of vehicle body models in which the shape of the foremost frame portion 40, the angle of the head pipe 41, and the like are respectively different from each other. The structures of the foremost frame portion 40 and the battery case 50 are not limited to those in the above-mentioned example. For example, the foremost frame portion 40 may be integral with the battery case 50.

As illustrated in FIG. 2, the foremost frame portion 40 in the example described here is positioned to the front of the battery case 50, and is attached to the battery case 50 in a front-rear direction of the vehicle. That is, the battery case 50 and the foremost frame portion 40 define the front surface and the rear surface, respectively, which are connected to each other in the front-rear direction. When the vehicle is travelling, a force of pushing the battery case 50 rearward may be applied from the head pipe 41. By virtue of the above-mentioned fixing structure of the battery case 50 and the foremost frame portion 40, it is possible to increase resistance of the frame against this force. In FIG. 2, a rear portion of the foremost frame portion 40 is provided with attachment places 40c through which tightening members such as bolts are inserted from a front side. The foremost frame portion 40 and the battery case 50 are fixed together with the tightening members. The fixing structure of the foremost frame portion 40 and the battery case 50 is not limited to that in the present example. For example, the foremost frame portion 40 and the battery case 50 may be attached together in the lateral direction. Specifically, a forward protruding portion may be provided in the front wall portion 52 of the battery case 50, and the protruding portion may be fixed to the rear portion of the foremost frame portion 40 in the lateral direction. The foremost frame portion 40 may include portions that are respectively positioned beside the side wall portions 53 of the battery case 50, and the portions of the foremost frame portion 40 may be respectively fixed to front portions of the side wall portions 53 in the lateral direction.

The lateral width of the foremost frame portion 40 in the example described here gradually increases rearward from the head pipe 41. By virtue of the shape of the foremost frame portion 40, it is possible to increase the strength of the frame. In the present example, the lateral width of a rear end of the foremost frame portion 40 corresponds to the front wall portion 52 of the battery case 50. The rear end of the foremost frame portion 40 is attached to right and left ends of the front surface of the front wall portion 52. By virtue of this structure, not only the front wall portion 52 of the battery case 50 but also the right and left side wall portions 53 are configured to receive a force of pushing the battery case 50 rearward, which is applied from the head pipe 41. As a result, it is possible to further increase resistance of the frame against the force applied from the head pipe 41 to the battery case 50 toward the rear. The lateral width of the rear end of the foremost frame portion 40 may not necessarily correspond to the front wall portion 52 of the battery case 50.

The foremost frame portion 40 in the example described here extends rearward from the head pipe 41 while being split into two branches. Accordingly, it is possible to reduce the weight of the foremost frame portion 40. The foremost frame portion 40 may not necessarily extend rearward from the head pipe 41 while being split into two branches.

As illustrated in FIG. 2, the vertical height of the foremost frame portion 40 in the example described here gradually increases rearward from the head pipe 41. By virtue of the shape of the foremost frame portion 40, it is possible to increase the number of attachment portions 40c between the foremost frame portion 40 and the front wall portion 52 of the battery case 50 in the vertical direction. As a result, it is possible to increase the strength of the battery case 50 against a force that is applied from the foremost frame portion 40 to the battery case 50 when the front wheel 2 moves in the vertical direction. A lower surface 40a of the foremost frame portion 40 in the example illustrated in FIG. 2 extends rearward, and is inclined rearward further than an upper surface 40b. The foremost frame portion 40 is attached to the front wall portion 52 of the battery case 50 using a plurality of the attachment portions 40c (four attachment portions 40c in the example illustrated in FIG. 2) that are aligned in the vertical direction.

As illustrated in FIG. 2, the frame includes a seat rail 59a that extends rearward from the battery case 50. The seat rail 59a supports a seat 6 (refer to FIG. 1) on which a rider can straddle. For example, the seat rail 59a is fixed to the rear wall portion 54 of the battery case 50. The frame includes a stay 59b that extends rearward and upward from a lower portion of the rear wall portion 54, and is connected to the seat rail 59a. As illustrated in FIG. 1, in the electric two-wheel vehicle 1 in the example described here, a rear portion of the seat 6 is positioned upward of the seat rail 59a, and a front portion of the seat 6 is positioned upward of the case cover 60. The front portion of the seat 6 is supported by the case cover 60. In the electric two-wheel vehicle 1 with this structure, for example, a user can detach the seat 6 via a key operation, and then open the case cover 60. In the present example, the front portion of the seat 6 may be hooked into an upper surface of the case cover 60.

As illustrated in FIG. 2, each of the side wall portions 53 of the battery case 50 in the example described here includes an upper edge that extends forward and upward. Specifically, an upper edge 53h of the front portion of each of the side wall portions 53 extends forward and upward. Accordingly, it is possible to prevent the vertical position of the rear portion of the case cover 60 from being increased in height, and maintain the position of the seat 6 at an appropriate height. Further, it is possible to increase, in the vertical direction, the number of connection portions between the battery case 50 and the foremost frame portion 40 while appropriately maintaining the height of the seat 6.

As illustrated in FIG. 3, the battery case 50 in the example described here has a length in the front-rear direction greater than a width in the lateral direction. Accordingly, it is possible to secure the size of the batteries 30, in other words, the charging capacity of the batteries 30 while preventing an increase in the vehicle width. As described above, the battery case 50 accommodates the plurality of batteries 30. The battery case 50 in the example described here accommodates two batteries 30. The two batteries 30 are arranged in the lateral direction. As illustrated in FIG. 5, the battery case 50 includes a beam portion 51 therein, and the beam portion 51 is disposed between the two batteries 30, and extends rearward from the front wall portion 52. As illustrated in FIG. 5, it is preferable that the beam portion 51 extend rearward from the front wall portion 52, and then be connected to the rear wall portion 54. The beam portion 51 may extend rearward from the front wall portion 52, and then may be connected to a rear portion of the bottom portion 55 of the battery case 50.

As described above, when the vehicle is travelling, a force of pushing the front wall portion 52 of the battery case 50 may be applied from the head pipe 41 due to the vertical movement of the front wheel 2. In this example, the right and left side wall portions 53 are deformed to swell in the rightward and leftward directions, respectively, depending on the rigidity of the battery case 50. In particular, since the battery case 50 in the example described here has a length in the front-rear direction greater than a width in the lateral direction, the side wall portions 53 are likely to be deformed. It is possible to secure the rigidity of the battery case 50, that is, the rigidity of the frame, while preventing this deformation by virtue of the beam portion 51.

As illustrated in FIG. 5, the beam portion 51 is preferably connected to not only the front wall portion 52 and the rear wall portion 54 but also the bottom portion 55. It is possible to further improve the rigidity of the battery case 50 by virtue of the structure of the beam portion 51. The beam portion 51 in the example illustrated in FIG. 5 is connected to a portion (specifically, a center portion in the front-rear direction) of the bottom portion 55. The shape of the beam portion 51 is not limited to that in the present example. For example, the beam portion 51 may have a rectangular or substantially rectangular shape in a side view, which corresponds to an inner surface of the battery case 50. That is, a lower edge of the beam portion 51 may extend from a foremost portion of the bottom portion 55 to a rearmost portion thereof.

The beam portion 51 may preferably include at least two portions that extend at least in two directions which are respectively inclined with respect to each other in a side view of the vehicle body. Specifically, the beam portion 51 in the example illustrated in FIG. 5 includes a first extending portion 51a, a second extending portion 51b, and a third extending portion 51c. It is preferable that the first extending portion 51a extend in the front-rear direction, and extend from an upper portion of the front wall portion 52 of the battery case 50 to an upper portion of the rear wall portion 54. In the side view of the vehicle body, the second extending portion 51b and the third extending portion 51c are disposed below the first extending portion 51a, and extend obliquely with respect to the first extending portion 51a. Specifically, the second extending portion 51b extends rearward and downward from the upper portion of the front wall portion 52, and is attached to the bottom portion 55 of the battery case 50. In the example illustrated in FIG. 5, a front end of the second extending portion 51b is continuous with a front end of the first extending portion 51a. The third extending portion 51c extends forward and downward from the upper portion of the rear wall portion 54, and is attached to the bottom portion 55 of the battery case 50. In the example illustrated in FIG. 5, a rear end of the third extending portion 51c is continuous with a rear end of the first extending portion 51a. It is possible to improve the rigidity of the battery case 50 while reducing the weight of the beam portion 51 by virtue of the shape of the beam portion 51. An opening 51d is provided inside the three extending portions 51a, 51b, and 51c. An opening 51e is provided between the first extending portion 51a and the third extending portion 51c. It is possible to reduce the weight and cost of the beam portion 51 by virtue of the openings 51d and 51e.

The shape of the beam portion 51 is not limited to that in the present example. For example, the second extending portion 51b may extend from the upper portion of the front wall portion 52 toward the lower portion of the rear wall portion 54. For example, the third extending portion 51c may extend from the upper portion of the rear wall portion 54 toward a lower portion of the front wall portion 52. In this example, the beam portion 51 may not include the first extending portion 51a. That is, the beam portion 51 may have an X shape. In addition, the beam portion 51 may not necessarily include the second extending portion 51b and/or the third extending portion 51c. In the example illustrated in FIG. 5, the lower end of the second extending portion 51b is integrated with the lower end of the third extending portion 51c, in which the lower ends are attached to the bottom portion 55, however, the lower ends may be separate from each other in the front-rear direction.

The beam portion 51 preferably has a plate shape. That is, the thickness of the first extending portion 51a in a plan view thereof is less than a vertical height Wa (refer to FIG. 5) in a side view and the length in the front-rear direction. Similarly, the thickness of each of the second extending portion 51b and the third extending portion 51c in a plan view thereof is less than a vertical height in a side view thereof. Accordingly, it is easy to secure the lateral width of a space to accommodate the batteries 30 while effectively preventing the battery case 50 from being deformed. That is, the beam portion 51 does not become an obstacle for the arrangement of the batteries 30.

FIG. 6 is a view illustrating the attachment structure of the beam portion 51 with respect to the battery case 50, and schematically illustrates a cross-section of the battery case 50 taken along line VI-VI in FIG. 5. A front end of the beam portion 51 is provided with attachment portions 51f that extend in the rightward and leftward direction, respectively. In the example illustrated in FIG. 6, the attachment portions 51f extend from the front end of the first extending portion 51a in the rightward and leftward directions, respectively. The attachment portions 51f are attached to the front wall portion 52 of the battery case 50 in the front-rear direction. That is, the attachment portions 51f and the front wall portion 52 are fixed together with tightening members 51k such as bolts, which are inserted through the attachment portions 51f and the front wall portion 52 from the front side or a rear side thereof. It is possible to prevent a clearance from occurring between the first extending portion 51a and the front wall portion 52 by virtue of this attachment structure. As a result, it is easy for the beam portion 51 to receive a force of pushing from the front wall portion 52, which is applied from the foremost frame portion 40.

A rear end of the beam portion 51 is provided with attachment portions 51g that extend in the rightward and leftward direction, respectively. In the example illustrated in FIG. 6, the attachment portions 51g extend from the rear end of the first extending portion 51a in the rightward and leftward directions, respectively. The attachment portions 51g are attached to the rear wall portion 54 of the battery case 50 in the lateral direction. Specifically, a convex portion is provided in the rear wall portion 54, and the attachment portions 51g and the convex portion are fixed together with tightening members 51m such as bolts, which are inserted through the attachment portions 51g and the convex portion from right and left sides thereof.

The attachment structure of the beam portion 51 is not limited to that in the present example. For example, the front end of the beam portion 51 may be attached to the front wall portion 52 in the lateral direction. In addition, the rear end of the beam portion 51 may be attached to the rear wall portion 54 in the front-rear direction. The beam portion 51 may be integral with the battery case 50.

As illustrated in FIG. 6, the beam portion 51 preferably includes limiting portions 51h and 51j configured to limit the movement of the batteries 30 in the front-rear direction. A front portion of the beam portion 51 in the example illustrated here is provided with two limiting portions 51h that extend in the rightward and leftward directions, respectively. In addition, a rear portion of the beam portion 51 is provided with two limiting portions 51j that extend in the rightward and leftward directions, respectively. A distance between the front limiting portions 51h and the rear limiting portions 51j correspond to the length in the front-rear direction of each of the batteries 30. The beam portion 51 illustrated in FIG. 5 includes the limiting portions 51h and 51j in upper portions of the beam portion 51, respectively. The limiting portions 51h and 51j in the example illustrated here extend from the first extending portion 51a in the rightward and leftward directions. The rear end of the beam portion 51 is provided with two attachment portions 51g that are separate from each other in the vertical direction. The rear limiting portions 51j are laid between the two attachment portions 51g, respectively. Accordingly, compared to when the limiting portions 51j are located at positions that are separate and forward from the attachment portions 51g, it is possible to increase the length in the front-rear direction of each of the batteries 30.

For example, the material of the beam portion 51 may be different from that of the battery case 50. The material of the beam portion 51 may be the same as that of the battery case 50. For example, the material of the beam portion 51 is preferably metal (aluminum, iron, an alloy thereof, or the like), however, the material may be a composite material including carbon fibers.

As described above, the number of batteries 30 accommodated in the battery case 50 may be greater than two, for example. In this case, the beam portions 51 may be provided between every two batteries 30, or the beam portion 51 may be provided between only any two of the batteries 30. The plurality of batteries arranged in the front-rear direction may be disposed on right and left sides of the beam portion 51. The beam portion 51 is preferably arranged in the center of the battery case 50 in the lateral direction.

As described above, the battery case 50 includes the right and left side wall portions 53. Each of the side wall portions 53 includes steps that extend on the outer surface thereof. As illustrated in FIG. 2, each of the side wall portions 53 preferably includes steps 53a, 53b, 53c, and 53d which extend rearward and downward. Accordingly, it is possible to prevent the right and left side wall portions 53 from being deformed when the force is applied from the foremost frame portion 40 to the battery case 50. The pivot shaft 8 of the rear arm 7 which supports the rear wheel 5 is positioned rearward and downward of the front wall portion 52 of the battery case 50 (refer to FIG. 1). Accordingly, by virtue of the steps 53a, 53b, 53c, and 53d, it is possible to increase the strength of the side wall portions 53 against a force that is applied from the front wall portion 52 of the battery case 50 to the pivot shaft 8. The extending direction of each of the steps 53a, 53b, 53c, and 53d is not limited to that in the present example. For example, the steps 53a, 53b, 53c, and 53d may extend in the front-rear direction, or may extend rearward and upward. Even in this case, it is possible to improve the rigidity of the frame while preventing the deformation of the right and left side wall portions 53.

As illustrated in FIG. 2, each of the side wall portions 53 preferably includes a plurality of steps 53a, 53b, 53c, and 53d that are aligned in the vertical direction. Accordingly, it is possible to further increase the rigidity of the side wall portions 53. The number of steps provided in each of the side wall portions 53 is not limited to that in the present example, and may be one.

Each of the side wall portions 53 in the example illustrated in FIG. 2 includes the step 53a that is located at the highest position among the plurality of steps 53a, 53b, 53c, and 53d. A portion 53e which is positioned higher than the rear portion of the step 53a is positioned closer to the center of the direction of the vehicle width than a portion 53f positioned lower than the step 53a. When the rider sits on the seat 6, the rider interposes the rear portion of the battery case 50 with the right and left feet. By virtue of the above-mentioned step 53a, the lateral width of the rear portion of the battery case 50 decreases. As a result, the rider can comfortably interpose the battery case 50 with the feet.

Each of the side wall portions 53 in the example illustrated in FIG. 2 includes a concave portion 53g in an outer surface thereof. Edges of the concave portion 53g define the steps 53b and 53c. The concavities and convexities provided on each of the side wall portions 53 for the steps 53a, 53b, 53c, and 53d are not limited to that illustrated in FIG. 2, and may be appropriately changed.

FIGS. 7A and 7B are cross-sectional views of the side wall portion 53 of the battery case 50 and the case cover 60. FIG. 7A is a cross-sectional view taken along line VIIa-VIIa illustrated in FIG. 2. FIG. 7B is a cross-sectional view taken along line VIIb-VIIb illustrated in FIG. 2. As illustrated in FIGS. 7A and 7B, the upper edges of the wall portions 52, 53, and 54 of the battery case 50 are preferably provided with an overhang portion 50a that overhangs inward or outward of the battery case 50. As described above, the upper surface of the battery case 50 is open. For this reason, the upper edge of the battery case 50 is likely to be deformed (that is, likely to be bent). It is possible to prevent the upper edge of the battery case 50 from being deformed by virtue of the overhang portion 50a provided at the upper edge of the battery case 50. The overhang portion 50a preferably extends around the entire circumference of the upper edge, however, the formation of the overhang portion 50a is not necessarily limited to that in the present example. For example, the overhang portion 50a may be provided at only the upper edge of each of the side wall portions 53.

As illustrated in FIGS. 7A and 7B, the overhang portion 50a preferably overhangs inward of the battery case 50. A lower edge of the case cover 60 surrounds an outer side of the overhang portion 50a. By virtue of this structure, it is possible to prevent water caught on the case cover 60 from intruding into the battery case 50 while securing the rigidity of the upper edge of the battery case 50.

In the example illustrated in FIGS. 7A and 7B, a seal member 50b is attached to the overhang portion 50a, and seals a gap between the overhang portion 50a and the case cover 60. In the example of the battery case 50, the seal member 50b is preferably provided on the entire circumference of the upper edge of the battery case 50, however, the provision of the seal member 50b is not necessarily limited to that in the present example. In the battery case 50 in the example described here, the seal member 50b preferably is attached to the upper edge of the front wall portion 52, the upper edges of each of the side wall portions 53, and a portion of the upper edge of the rear wall portion 54. Air in the battery case 50 can be discharged via a portion (hereinafter, referred to as an opening portion) of the upper edge of the rear wall portion 54, in which the seal member 50b is not provided. Air in the battery case 50, which is warmed up by the batteries 30, can be released to the outside via the opening portion.

As illustrated in FIG. 7A, it is preferable that the step 53a of each of the side wall portions 53 be positioned below the lower edge of the case cover 60, and be provided along the lower edge of the case cover 60. Accordingly, the step 53a serves to secure the strength of the battery case 50, and also functions as a support portion for the case cover 60. A front portion of the step 53a in the example described here has a lateral width (W1) greater than that of the rear portion thereof. The front portion of the step 53a is positioned below the lower edge of the case cover 60, is provided along the lower edge of the case cover 60, and supports a front portion of the lower edge of the case cover 60. The step 53a may not necessarily serve to support the case cover 60.

The battery case 50 is preferably defined by the right and left case half bodies that are assembled together with tightening members such as bolts in the lateral direction. Each of the right and left case half bodies is an integral member. Here, the right case half body defines a right portion of the battery case 50, and the left case half body defines a left portion of the battery case 50. Accordingly, it is possible to improve the rigidity of the battery case 50 against a vertical force. According to the structure of the battery case 50, the dies are slid in the lateral direction when the case half bodies are cast. For this reason, it is possible to relatively easily form the overhang portion 50a and the steps 53a, 53b, 53c, and 53d. When the battery case 50 includes the right and left case half bodies, the attachment positions (positions for the insertion of the tightening members) of the right case half body with respect to the left case half body are not provided in the side surfaces of the battery case 50. For this reason, it is possible to reduce the lateral width of the battery case 50, that is, the vehicle width. The structure of the battery case 50 is not limited to that in the present example. For example, the battery case 50 may include a case half body that defines the front portion of the battery case 50, and a case half body that defines the rear portion thereof. As described above, the electric two-wheel vehicle 1 in the example described here includes the case C defined by the battery case 50 and the motor case 70 in upper and lower portions of the case C, respectively. The case C includes the right case half body CR and the left case half body CL which are assembled together in the lateral direction. Even in a structure in which the battery case 50 and the motor case 70 are separate, the battery case 50 may include the right and left case half bodies which are assembled together in the lateral direction. Even in this case, it is possible to improve the rigidity of the battery case 50 against a vertical force applied to the vehicle body.

As described above, the overhang portion 50a of the battery case 50 illustrated in FIGS. 7A and 7B overhangs inward of the battery case 50. For this reason, it is necessary to make the length in the front-rear direction of each of the batteries 30 less than a distance between the front wall portion 52 and the rear wall portion 54 of the battery case 50. In addition, it is necessary to make the lateral width of each of the batteries 30 less than a distance between the beam portion 51 and each of the side wall portions 53. In this structure, as illustrated in FIG. 6, limiting portions 58a and 58b configured to limit the movement of each of the batteries 30 in the front-rear direction are preferably provided on the inner surface of the battery case 50. A gap between the front limiting portion 58a and the rear limiting portion 58b corresponds to the length in the front-rear direction of each of the batteries 30. Limiting portions 58c and 58d configured to limit the lateral movement of each of the batteries 30 are preferably provided on the inner surface of the battery case 50. A distance between the beam portion 51 and each of the limiting portions 58c and 58d corresponds to the lateral width of each of the batteries 30. The limiting portions 58a, 58b, 58c, and 58d and the limiting portions 51h and 51j of the beam portion 51 are provided at lower positions than that of the overhang portion 50a.

As illustrated in FIG. 5, the limiting portions 58a, 58b, 58c, and 58d are preferably provided in upper and lower portions of the battery case 50. In the example illustrated in FIG. 5, the battery case 50 includes front members 58Fu and 58FL that include the front limiting portions 58a and 58c and define the position of the front portion of the battery case 50. The front member 58Fu is attached to the inner surface of the upper portion of the battery case 50, and the front member 58FL is attached to the inner surface of the lower portion of the battery case 50. The battery case 50 includes rear members 58Ru and 58RL that include the rear limiting portions 58b and 58d and define the position of the rear portion of the battery case 50. The rear member 58Ru is attached to the inner surface of the upper portion of the battery case 50, and the rear member 58RL is attached to the inner surface of the lower portion of the battery case 50. In an example, the limiting portions 58a, 58b, 58c, and 58d are molded separately from the battery case 50. Accordingly, it is easy to change the material and the position of the limiting portions 58a, 58b, 58c, and 58d in conformity with the size and the material of the batteries 30. Alternatively, the limiting portions 58a, 58b, 58c, and 58d may be integrally molded with the battery case 50.

For example, the material of the limiting portions 58a, 58b, 58c, and 58d is resin. Accordingly, it is possible to reduce a force applied to the batteries 30 when the batteries 30 come into contact with the limiting portions 58a, 58b, 58c, and 58d. The material of the limiting portions 58a, 58b, 58c, and 58d is not limited to resin, and may be metal.

In the electric two-wheel vehicle 1 illustrated in FIG. 1, a rear suspension 9 is disposed to the rear of the battery case 50. For example, an upper end of the rear suspension 9 is attached to an attachment portion 54b (refer to FIG. 2) that is located in the rear wall portion 54 of the battery case 50. For example, a lower end of the rear suspension 9 is supported by the rear arm 7 via a linkage mechanism. The disposition of the rear suspension 9 is not limited to that in the above-mentioned example. For example, the rear suspension 9 may be disposed below the motor case 70.

As described above, the electric two-wheel vehicle 1 includes the case cover 60 that functions as a cover of the battery case 50 and is configured to be open and closed. As illustrated in FIG. 4, the case cover 60 is provided with a shaft portion 60a by which the case cover 60 is supported to be able to be opened and closed. The case cover 60 is provided with an engaging member 62 to lock the case cover 60 in a closed state. The vehicle body is provided with an engaged portion 50c into which the engaging member 62 is hooked. In the present example, the shaft portion 60a is provided in a rearmost portion of the case cover 60, and the engaging member 62 is provided in a foremost portion of the case cover 60. Accordingly, when the case cover 60 is opened, the case cover 60 does not interfere with the handlebar 4, and thus it is easy to increase the size of the battery case 50 in the forward direction. The positions of the shaft portion 60a and the engaging member 62 are not limited to those in the present example. For example, the shaft portion 60a may be provided in the foremost portion of the case cover 60, and the engaging member 62 may be provided in the rearmost portion of the case cover 60.

As illustrated in FIG. 3, for example, the battery case 50 is provided with the engaged portion 50c into which the engaging member 62 is hooked, and a support portion 50d for supporting the shaft portion 60a. Specifically, the engaged portion 50c and the support portion 50d are integral with the case half bodies CR and CL of the battery case 50. Accordingly, it is possible to reduce the tolerance in distance between the engaged portion 50c and the support portion 50d. As a result, it is possible to reduce a clearance between the lower edge of the case cover 60 and the upper edge of the battery case 50. The positions of the engaged portion 50c and the support portion 50d are not limited to those in the present example. For example, the engaged portion 50c may be provided in the foremost frame portion 40.

The electric two-wheel vehicle 1 includes the bottom portion that supports the lower surface of each of the batteries 30. In the electric two-wheel vehicle 1 in the example described here, the battery case 50 is provided with the bottom portion 55. As illustrated in FIGS. 3 and 5, the bottom portion 55 is provided with springs 57 (hereinafter, the spring 57 is referred to as a lower spring). The bottom portion 55 supports the lower surface of each of the batteries 30 via the lower springs 57. The electric two-wheel vehicle 1 includes the cover that covers an upper surface of each of the batteries 30. Specifically, the electric two-wheel vehicle 1 includes the case cover 60. As illustrated in FIG. 4, the case cover 60 includes springs 61 that interpose the batteries 30 between the springs 61 and the lower springs 57 in the vertical direction (hereinafter, the spring 61 is referred to as an upper spring). In a state in which the case cover 60 is closed, and the batteries 30 are accommodated in the battery case 50, the lower springs 57 support the lower surface of each of the batteries 30, and can be elastically deformed in an extension direction and a compression direction ("the state in which the case cover 60 is closed" means a state where the engaging member 62 engages with the engaged portion 50c and thus the case cover 60 is locked at the closed state.). In the above-mentioned state, the upper springs 61 push the upper surface of each of the batteries 30, and can be elastically deformed in an extension direction and a compression direction. That is, the spring constant and the initial length of the springs 57 and 61 are determined such that both of the spring 57 and 61 are allowed to extend and shrink and the springs 57 and 61 and apply a force to the batteries 30 to hold the batteries 30 there between even when the batteries 30 do not vibrate in the vertical direction. Accordingly, even when the batteries 30 vibrate in the vertical direction with respect to the vehicle body due to the vibration of the vehicle body while the vehicle is travelling, it is possible to prevent the vibration of the batteries 30 from being transmitted to the rider by virtue of the lower springs 57 and the upper springs 61. In addition, it is possible to significantly reduce or prevent an impact applied to the batteries 30. The spring constant and the initial length of the springs 57 and 61 are preferably determined such that the load applied to the springs 57 and 61 does not go beyond the elastic limit even when a supposable maximum vibration (acceleration) is applied to the vehicle body ("elastic limit" is a maximum load applied to a spring, which allows the spring to completely return to the initial state after the load is removed from the spring).

As illustrated in FIG. 3, the bottom portion 55 is preferably provided with the plurality of lower springs 57 that are disposed while being distributed in the front-rear direction. As illustrated in FIG. 4, the case cover 60 is preferably provided with the plurality of upper springs 61 that are disposed while being distributed in the front-rear direction. The length in the front-rear direction of each of the batteries 30 is greater than the width in the lateral direction thereof. The plurality of lower springs 57 and the plurality of upper springs 61 are particularly effective for the batteries 30 with the above-mentioned shape.

The electric two-wheel vehicle 1 in the example described here includes the plurality of batteries 30 that are arrayed in the lateral direction. The bottom portion 55 includes the plurality of lower springs 57 that are arranged in the front-rear direction for each of the batteries 30. Specifically, the bottom portion 55 is provided with four lower springs 57 for each of the batteries 30. The number of lower springs 57 provided for each of the batteries 30 is not limited to four.

As illustrated in FIG. 3, the plurality of lower springs 57 are preferably disposed while being also distributed in the lateral direction. That is, the plurality of lower springs 57 include the lower springs 57 that support a right portion of the lower surface of each of the batteries 30, and the lower springs 57 that support a left portion of the lower surface of each of the batteries 30. Accordingly, it is possible to further increase the support stability of the batteries 30 supported by the lower springs 57. The disposition of the lower springs 57 is not limited to that in the above-mentioned example, and may be variously changed.

As illustrated in FIG. 3, connectors 71 are disposed in the bottom portion 55 of the battery case 50, and are electrically connected to connectors 32 (refer to FIGS. 15 and 16) (to be described below) of the batteries 30, respectively. The plurality of lower springs 57 include a lower spring 57 that is positioned rightward or leftward of the connector 71. Accordingly, it is possible to stably support the batteries 30 in the vicinity of the connectors 71. The connectors 71 are provided in a front portion of the bottom portion 55 of the battery case 50. In the example illustrated in FIG. 3, among the plurality of lower springs 57, the lower spring 57 at a foremost position is positioned rightward of the connector 71.

The case cover 60 includes the plurality of upper springs 61 that are disposed while being distributed in the front-rear direction for each of the plurality of batteries 30. Specifically, the case cover 60 includes two upper springs 61 that are aligned in the front-rear direction for each of the batteries 30. The number of upper springs 61 provided for each of the batteries 30 may be greater than two, for example. The case cover 60 may include the plurality of upper springs 61 that are disposed while being distributed in the lateral direction for each of the plurality of batteries 30. That is, the plurality of upper springs 61 may include an upper spring 61 that pushes a right portion of the upper surface of each of the batteries 30, and an upper spring 61 that pushes a left portion of the upper surface of each of the batteries 30. Accordingly, it is possible to further increase the support stability of the batteries 30 supported by the upper springs 61 and the lower springs 57.

As described above, the inner surface of the battery case 50 in the example described here is provided with the limiting portions 58a and 58b configured to limit the movement of each of the batteries 30 in the front-rear direction (refer to FIG. 6). The inner surface of the battery case 50 is provided with the limiting portions 58c and 58d configured to limit the lateral movement of each of the batteries 30. In addition, the beam portion 51 includes the limiting portions 51h and 51j. Even when the extension and compression of the upper springs 61 and the lower springs 57 causes the batteries 30 to roll, it is possible to limit the movement in an oscillating direction to the movement in the vertical direction by virtue of the limiting portions.

The electric two-wheel vehicle 1 is preferably provided with an adjuster mechanism configured to adjust a force of interposing the batteries 30 between the upper springs 61 and the lower springs 57. By virtue of the adjuster mechanism, it is possible to prevent the elastic force of the springs 61 and 57 from applying an excessive load to the batteries 30, it is possible to optimize the force of interposing the batteries 30 between the springs 61 and 57, and the batteries 30 can be prevented from rattling while travelling.

As described above, the case cover 60 is provided with the shaft portion 60a by which the case cover 60 is supported to be able to be opened and closed (refer to FIG. 4). The case cover 60 is provided with the engaging member 62 for locking the case cover 60 in a closed state (refer to FIG. 2). The vehicle body is provided with the engaged portion 50c into which the engaging member 62 is hooked (refer to FIG. 2). The adjuster mechanism preferably adjusts the height of at least one of the shaft portion 60a, the engaging member 62, and the engaged portion 50c. Accordingly, since the adjuster mechanism is provided at a relatively high position, the user has easy access to the adjuster mechanism.

Figure 8:
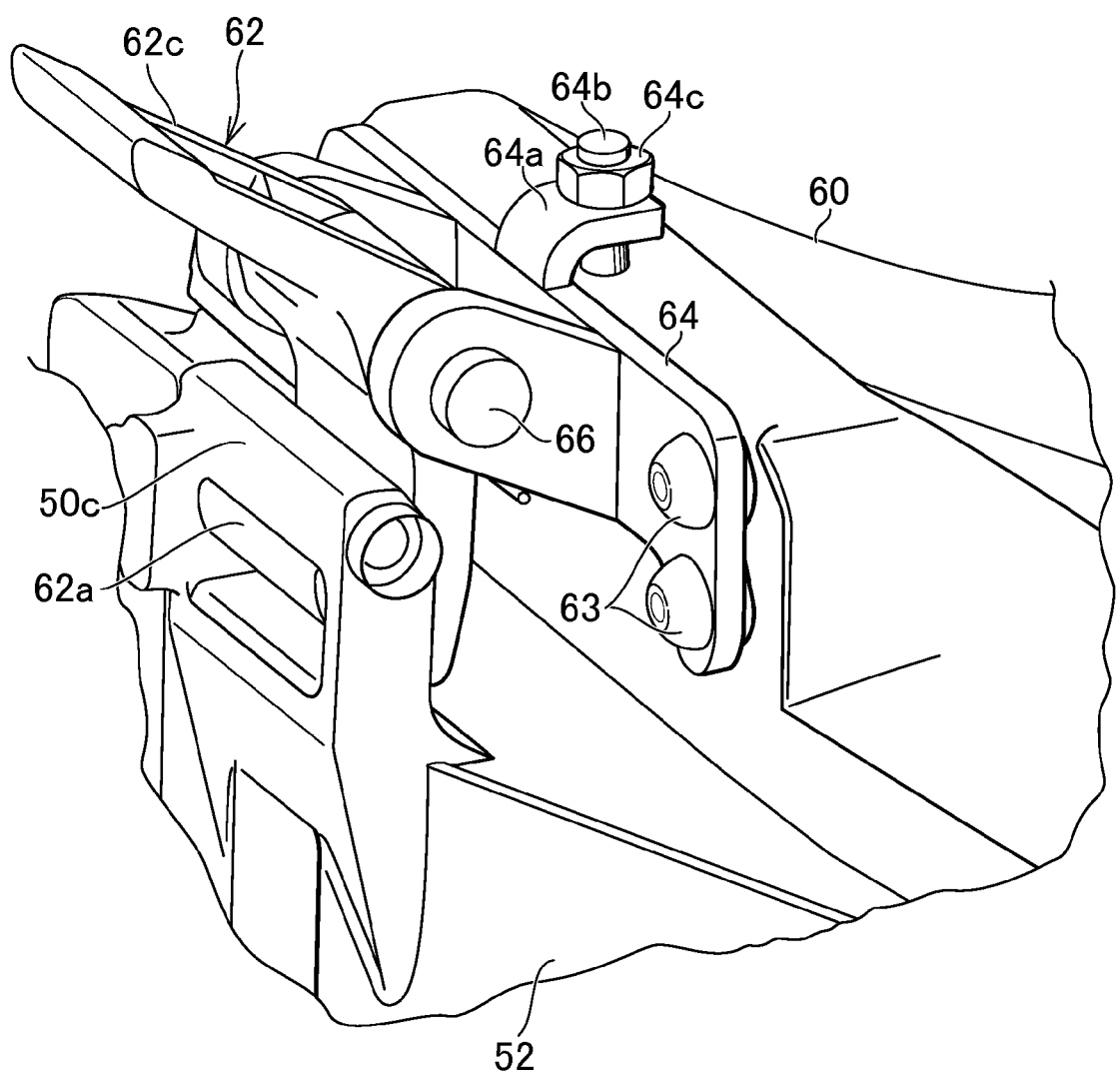
FIG. 8 is a perspective view illustrating an example of an adjuster mechanism.

FIG. 8 is a perspective view illustrating an example of the adjuster mechanism. FIG. 8 illustrates the engaging member 62 provided on a front side of the case cover 60, and the engaged portion 50c. The adjuster mechanism in the example illustrated in FIG. 8 is provided in the case cover 60. Specifically, a support member 64 is attached to a front surface of the case cover 60 using tightening members 63 such as bolts, for example. The engaging member 62 includes a hook portion 62a that engages with the engaged portion 50c, and an operation portion 62c operated by the user. The engaging member 62 can turn about a shaft 66 that is inserted between the operation portion 62c and the hook portion 62a and supported by the support member 64. The support member 64 is configured to move vertically relative to the front surface of the case cover 60. Specifically, holes are provided in the support member 64 and the front surface of the case cover 60, in which the tightening members 63 are respectively inserted through the holes. The holes are vertically elongated. Accordingly, it is possible to make the support member 64 move vertically relative to the case cover 60 by loosening the tightening members 63. It is possible to adjust the height of the engaging member 62 by moving the position of the support member 64.

The support member 64 in the example illustrated in FIG. 8 includes an extending portion 64a that is positioned upward of the upper surface of the case cover 60. A member is attached to the extending portion 64a, and defines a distance between the extending portion 64a and the upper surface of the case cover 60. Specifically, a bolt 64b is inserted through the extending portion 64a and the case cover 60 from the underside of the case cover 60. A nut 64c is attached to the bolt 64b, and is disposed upward of the extending portion 64a. It is possible to define the distance between the extending portion 64a and the upper surface of the case cover 60 by rotating the nut 64c.

For example, the height of the engaging member 62 provided in the case cover 60 can be adjusted by the following process. Initially, the engagement between the engaging member 62 and the engaged portion 50c of the battery case 50 is released. In this example, the elastic force of the upper springs 61 separate the case cover 60 from the battery case 50. After an operator loosens the tightening members 63, the operator adjusts a distance between the support member 64 and the battery case 50 to an appropriate pre-set distance while vertically changing the position of the support member 64 via the rotation of the nut 64c. Thereafter, the user fixes the tightening members 63.

The adjuster mechanism is not limited to that in the above-mentioned example. For example, the support member 64 may not be provided with the extending portion 64a. The engaged portion 50c may be attached to the battery case 50 using tightening members such as bolts, and thus it may be possible to vertically move the position of the engaged portion 50c. The support portion 50d (refer to FIG. 2) configured to support the shaft portion 60a provided on a rear side of the case cover 60 may be attached to the battery case 50 using tightening members such as bolts, and thus it may be possible to vertically move the position of the support portion 50d. Instead of the engaging member 62 of the case cover 60, a hook may be provided in the engaged portion 50c of the battery case 50, and the engaged portion 50c may be supported to be able to turn.

As described above, the battery case 50 accommodates the plurality of batteries 30, and the case cover 60 covers the plurality of batteries 30. The case cover 60 is provided with the adjuster mechanism (the support member 64, the tightening members 63, and the long holes through which the tightening members 63 are inserted). For this reason, it is possible to adjust a force that is applied to the entirety of the batteries 30 from the upper springs 61 and the lower springs 57, by adjusting the height of the engaging member 62 of the case cover 60. As a result, it is possible to improve the adjustability.

The engaging member 62 may be provided with a switch that detects the movement (state of the engagement between the engaging member 62 and the engaged portion 50c) of the engaging member 62. The supply of electrical power from the batteries 30 to the vehicle body may be stopped when the engagement between the engaging member 62 and the engaged portion 50c is released.

As described above, the connectors 71 are disposed in the bottom portion 55 of the battery case 50. It is preferable that the connectors 71 be supported to move integrally with the connectors 32 even when the batteries 30 oscillate between the upper springs 61 and the lower springs 57, which will be described below in detail. Specifically, the connectors 71 are preferably supported to be able to move in the vertical direction. Accordingly, even when the batteries 30 oscillate between the upper springs 61 and the lower springs 57, the connectors 71 can follow the movement of the connectors 32, respectively, and as a result, it is possible to prevent the terminals of the connectors 71 and 32 from being worn out.

The electric motor 21 is preferably disposed below the batteries 30. As described above, the electric two-wheel vehicle 1 in the example described here includes the battery case 50. As illustrated in FIG. 5, the electric motor 21 is disposed below the battery case 50. The electric two-wheel vehicle 1 includes the motor case 70 as an accommodating portion which accommodates the electric motor 21. The rotary shaft of the electric motor 21 is disposed in the lateral direction. The speed reducer mechanism (the gear 22) and the output shaft 23 are also disposed below the battery case 50, and the motor case 70 accommodates the drive system 20 that includes the electric motor 21, the speed reducer mechanism, and the output shaft 23. The motor case 70 supports the rotary shaft of the electric motor 21, the shaft of the speed reducer mechanism, and the output shaft 23 while allowing the shafts to rotate.

As described above, in the example of the electric two-wheel vehicle 1, the motor case 70 is integral with the battery case 50. As described above, the electric two-wheel vehicle 1 in the example described here includes the case C. The case C includes the battery case 50 in the upper portion of the case C, and the motor case 70 in the lower portion thereof. As illustrated in FIG. 4, the case C includes of the right case half body CR and the left case half body CL. The right case half body CR defines the right portion of the battery case 50, and a right portion of the motor case 70. The left case half body CL defines the left portion of the battery case 50, and a left portion of the motor case 70. Since the motor case 70 and the battery case 50 are integral in this manner, it is possible to improve the rigidity of the battery case 50 by virtue of the motor case 70.

The motor case 70 preferably is defined by two members (the right and left case half bodies CR, CL in the example described here) that are assembled together in the lateral direction, for example. Accordingly, members (tightening members such as bolts) to assemble the two members are not necessarily provided on the outer side of the side surfaces of the case C. Thus, increase of the width of the case C in the lateral direction is prevented. And the size of the electronic motor 21 is increased in the axis direction (the lateral direction) of the electronic motor 21, compared with that in a structure where tightening members (such as bolts) to assemble the two members are provided on the outer side of the side surfaces of the case C, and thus the size of the electronic motor 21 can be increased in the radial direction thereof. As a result, it is possible to reduce the size of the drive system 20 including a motor control unit 29 (to be described below) and the electric motor 21 in the front-rear direction.

The structures of the battery case 50 and the motor case 70 are not necessarily limited to those in the present example. For example, as will be described below, the battery case 50 and the motor case 70 may be separate, and the motor case 70 may be fixed to the battery case 50 using tightening members such as bolts. In this example, it is possible to use the battery case 50 which is common for a plurality of vehicle body models in which the structures of the motor case 70 are different from each other. As described in FIG. 2, pivot support members 78 are attached to right and left rear portions of the motor case 70. The pivot support members 78 support the pivot shaft 8 of the rear arm 7.

The electric two-wheel vehicle 1 includes the motor control unit 29 (refer to FIG. 5) configured or programmed to control the electric motor 21. The motor control unit 29 includes an inverter that converts direct current of the batteries 30 into alternating current to drive the electric motor 21. The motor control unit 29 receives electrical power from the batteries 30, and supplies the electrical power to the electric motor 21. The motor control unit 29 includes a control device configured or programmed to control the inverter. For example, a signal is input to the control device from a sensor that detects the amount of operations of the accelerator grip.

The control device controls the inverter based on the amount of operations of the accelerator grip, which is detected by the sensor.

As illustrated in FIG. 5, the motor control unit 29 is disposed to the front of the electric motor 21. In this layout, since wind is likely to blow against the motor control unit 29 while the vehicle is travelling, it is possible to improve the cooling performance of the motor control unit 29. For example, the motor control unit 29 is disposed in a foremost portion of the case C.

The electric two-wheel vehicle 1 includes an accommodating portion that accommodates the motor control unit 29. As illustrated in FIG. 5, the electric two-wheel vehicle 1 in the example described here includes a case 28 as the accommodating portion. The case 28 is preferably arranged such that the front surface thereof receives wind when the vehicle is travelling. Further, the front surface of the case 28 preferably includes a plurality of heat radiating fins 28a. The case 28 in the example illustrated in FIG. 5 is separate from the motor case 70, and is attached to the front side of the motor case 70. Here, the "accommodating portion" indicates a portion that accommodates the motor control unit 29, and the shape of the accommodating portion is not necessarily limited to the box-shaped case 28. For example, a portion in which the motor control unit 29 is disposed may be integral with the motor case 70, and the portion may function as the accommodating portion. In this example, the accommodating portion may not be necessarily completely closed. The accommodating portion for the motor control unit 29 may be supported not by the motor case 70 but by the battery case 50.

A foremost portion of the motor case 70 in the example described here is provided with a concave portion that is open forward, and the case 28 is fitted into the concave portion. In this example, right and left sides of the case 28 are preferably covered with side wall portions of the motor case 70, respectively. A lower side of the case 28 is also preferably covered with a lower wall portion of the motor case 70. As a result, the motor case 70 effectively protects the case 28. The attachment structure of the case 28 is not limited to that in the present example. For example, the case 28 may be attached to a front surface of the motor case 70.

In the present example, as illustrated in FIG. 5, the case 28 preferably has a box-shaped case main body 28b that is open forward, and a cover 28c that is attached to a front side of the case main body 28b and has the fins 28a.

As described below in detail, the batteries 30 include the connectors 32 electrically connected to the connectors 71 provided in the vehicle body, respectively. Each of the connectors 32 in the example illustrated here is provided in a front portion of each of the batteries 30. Thus, the connectors 71 are positioned in the front portion of the battery case 50. Accordingly, it is possible to reduce a distance between the connectors 32 and 71 and the motor control unit 29, and reduce electrical power loss in a path from the batteries 30 to the motor control unit 29. As illustrated in FIG. 5, the connectors 71 are disposed upward of the motor control unit 29. It is possible to more effectively reduce the distance between the connectors 71 and the motor control unit 29 by virtue of this layout. As a result, it is possible to more effectively reduce the length of a wire harness (not illustrated) that connects the connectors 71 and the motor control unit 29 and reduce electrical power loss.

As illustrated in FIG. 5, in the present example, the case 28 is vertically disposed in an erect posture in the side view of the vehicle body. In other words, the case 28 is disposed in a posture in which the vertical height of the case 28 is greater than the length in the front-rear direction thereof. It is possible to achieve a compact layout in the front-rear direction of the drive system 20 that includes the case 28 (the motor control unit 29) and the electric motor 21 by virtue of the disposition of the case 28. By virtue of the disposition of the case 28, it is possible to increase the size of the front surface of the case 28, and thus it is possible to improve the cooling performance of the motor control unit 29. In addition, it is easy to secure a distance between the front wheel 2 and the front surface of the case 28, and it is possible to prevent mud or water from striking against the case 28 while the vehicle is travelling.

As described above, the front surface of the case 28 in the example described here includes the plurality of heat radiating fins 28a. Since it is possible to increase the size of the front surface of the case 28 in the above-mentioned disposition of the case 28, it is easy to provide the fins 28a. As described in FIG. 2, the plurality of fins 28a are preferably aligned in the lateral direction. Accordingly, even when mud or water strikes against the front surface of the case 28, it is possible to prevent the mud or water from accumulating between the fins 28a.

The case 28 in the example illustrated in FIG. 5 is obliquely disposed such that the lower portion of the case 28 is positioned farther rearward than the upper portion thereof. By virtue of the disposition of the case 28, it is possible to more effectively prevent mud or water from striking against the case 28 while the vehicle is travelling. It is easy to avoid interference between the front wheel 2 and the case 28 even when the front wheel 2 moves vertically relative to the vehicle body. A louver may be attached to the front surface of the case 28 such that the louver prevents mud or water from striking against the case 28 and allows wind to flow to the front surface of the case 28.

As illustrated in FIG. 5, in the present example, the case 28 is deviated upward with respect to the electric motor 21. In other words, a vertical center C1 of the case 28 is positioned higher than the center of the electric motor 21. By virtue of the layout of the case 28, it is possible to prevent mud or water from striking against the case 28 while the vehicle is travelling. In the example illustrated in FIG. 5, a lower surface of the case 28 is positioned higher than a lower surface 70a of a portion of the motor case 70, which accommodates the electric motor 21.

As illustrated in FIG. 5, the battery case 50 is inclined with respect to a horizontal direction (parallel or substantially parallel with a road surface) such that the front portion of the battery case 50 is positioned higher than the rear portion thereof. In other words, the bottom portion 55 of the battery case 50 is inclined with respect to the horizontal direction such that the front portion of the bottom portion 55 is positioned higher than the rear portion thereof. The case 28 is positioned below the front portion of the battery case 50. It is easy to increase the height of the case 28 by virtue of this layout. As a result, it is easy to prevent mud or water from striking against the front surface of the case 28.

In FIG. 4, straight line L1 is a straight line in a direction along the bottom portion 55 of the battery case 50, that is, a direction along the lower surface of the battery 30. In the electric two-wheel vehicle 1 in the example described here, the rotary center (shaft center) C1 of the electric motor 21 is disposed to be vertically deviated with respect to straight line L2 that passes through a rotary center (shaft center) C2 of the output shaft 23 and is parallel or substantially parallel with straight line L1 in the side view of the vehicle body. In other words, the shaft center C2 of the output shaft 23 is vertically deviated with respect to a straight line that passes through the shaft center C1 of the electric motor 21 and is along the lower surface of the battery 30. In the example illustrated in FIG. 4, the rotary center C1 of the electric motor 21 is disposed below straight line L2. Since the layout of the output shaft 23 and the electric motor 21 is designed as described above, it is possible to reduce a distance between straight line L3 passing through the rotary center C1 of the electric motor 21 (the straight line L3 is a straight line that passes through the rotary center C1 of the electric motor 21 and is perpendicular or substantially perpendicular to straight line L1) and the output shaft 23 while securing a distance between the rotary shaft of the electric motor 21 and the output shaft 23. That is, it is possible to reduce the distance between the electric motor 21 and the output shaft 23 in a direction along straight line L1. As a result, it is possible to achieve a compact arrangement of the drive system 20, and it is easy to secure a space to accommodate the motor control unit 29 in the front of the electric motor 21 and below the front portion of the battery case 50.

In the example illustrated in FIG. 4, the rotary center C3 of the gear 22 of the drive system 20 is positioned lower than a straight line that connects the rotary center C1 of the electric motor 21 and the rotary center C2 of the output shaft 23. Accordingly, it is possible to achieve a more compact arrangement of the drive system 20, and it is easy to secure a space to accommodate the motor control unit 29 in the front of the electric motor 21 and below the front portion of the battery case 50.

The electric two-wheel vehicle 1 includes a battery 81 (hereinafter, the battery 81 is referred to as an electrical component battery) that supplies electrical power to electrical components such as lamps (for example, a head lamp and a tail lamp), various sensors, and meters. The electrical component battery 81 outputs electrical power at a voltage lower than that of the batteries 30. As illustrated in FIG. 5, in the present example, the electrical component battery 81 is disposed between the drive system 20 and the batteries 30. The electrical component battery 81 is disposed inside the case C. The electrical component battery 81 is charged with electrical power supplied from the batteries 30. For this reason, it is possible to reduce a distance between the batteries 30 and the electrical component battery 81 by virtue of the layout of the electrical component battery 81.

In the present example, the electrical component battery 81 is disposed below the electric motor 21. That is, the electrical component battery 81 is disposed in a space that is provided above the electric motor 21 by disposing the electric motor 21 at a position lower than the straight line L2. The layout of the electrical component battery 81 is not necessarily limited to that in the present example. Other electrical components (for example, relays to control the energizing of the electrical components such as lamps from the electrical component battery 81 and fuses) may be disposed in the space above the electric motor 21, instead of or together with the electrical component battery 81.

As illustrated in FIG. 5, the bottom portion 55 of the battery case 50 described here includes a component accommodating member 55b. The component accommodating member 55b preferably includes a box-shaped accommodating portion 55c in a portion of the component accommodating member 55b. The electrical component battery 81 is disposed inside the accommodating portion 55c. The accommodating portion 55c preferably has a box shape with an open top. The bottom portion 55 includes a cover plate 55a that covers the opening of the accommodating portion 55c. The component accommodating member 55b is fixed to an inner surface of the case C that defines the battery case 50 and the motor case 70.

Wire harnesses extend from the accommodating portion 55c and are connected to the electrical components. FIG. 5 illustrates a wire harness 82 that extends rearward from the accommodating portion 55c. As described above, in the battery case 50 in the example described here, the seal member 50b is not provided in a portion (opening portion) of the upper edge of the rear wall portion 54. For example, the wire harness 82 extends in an inner upper region of the battery case 50, and then extends farther rearward than the battery case 50 through the opening portion provided on the upper edge of the rear wall portion 54.

The electric two-wheel vehicle 1 preferably includes a DC-DC converter that lowers the voltage of the batteries 30 to a charging voltage of the electrical component battery 81, and a relay to control the energizing of the motor control unit 29 from the batteries 30. These components are also accommodated in the motor case 70, and are disposed below the bottom portion 55. For example, these components are covered with the cover plate 55a of the bottom portion 55.

As described above, each of the batteries 30 is provided with the connector 32 (refer to FIGS. 15 and 16), and the bottom portion 55 of the battery case 50 is provided with the connectors 71 that are electrically connected to the connectors 32, respectively. Each of the connectors 71 includes a plurality of terminals. As illustrated in FIG. 5, each of the connectors 71 in the example described here includes pin-shaped terminals 71a and 71b that protrude upward. The terminal 71a is a power supply terminal configured to supply electrical power to the electric motor 21 to drive the electric motor 21. The terminal 71b is a signal terminal for communication between a built-in controller 34 (refer to FIG. 16) of the batteries 30 and the motor control unit 29 provided in the vehicle body. Each of the connectors 32 is provided with terminal 32a and 32b (refer to FIG. 15) into which the terminals 71a and 71b are fitted, respectively. Alternatively, each of the connectors 32 may be provided with pin-shaped terminals, and each of the connectors 71 may be provided with terminals into which the pin-shaped terminals are fitted, respectively. Each of the connectors 71 described here includes a guide 71f that extends upward. The guide 71f is fitted into a concave portion in the connector 32, and guides the connector 32 with respect to the position of the connector 71. The guide 71f may not be necessarily provided.

The batteries 30 are supported by elastic members. For example, the elastic members are members such as springs or rubber cushions which allow the oscillation of the batteries 30 and reduce vibration transmitted to the batteries 30 from the vehicle body. As described above, the batteries 30 in the example described here include the lower springs 57 as the elastic members. The batteries 30 can be vertically attached to, and detached from, the vehicle body, and when the batteries 30 are mounted on the vehicle body, the batteries 30 are supported by the lower springs 57. For this reason, when the vehicle is travelling, the batteries 30 oscillate in the vertical direction. The connectors 71 are configured so that it is possible to switch the states of the connectors 71 between a state (hereinafter, referred to as an unlock state) in which the movement of the connectors 71 is allowed to follow the oscillation of the batteries 30 and a state (hereinafter, referred to as a lock state) in which the movement of the connectors 71 is restricted. Each of the connectors 71 in the example described here is allowed to vertically move in the unlock state, and the vertical movement of each of the connectors 71 is restricted in the lock state. Accordingly, by bringing the connectors 71 into the unlock state while the vehicle is travelling, it is possible to prevent a load from being applied between the terminals 71a and 32a and between the terminals 71b and 32b, that is, prevent friction between the terminals 71a and 32a and between the terminals 71b and 32b. Further, by bringing the connectors 71 into the lock state when the user mounts the batteries 30 on the vehicle body, it is possible to smoothly fit the terminals 71a and 71b into the terminals 32a and 32b, respectively.

It is preferable that the electric two-wheel vehicle 1 be provided with a user-operable member (hereinafter, referred to as an operation member), and the states of the connectors 71 are switched between the lock state and the unlock state based on the movement of the operation member. Accordingly, it is possible to switch the states of the connectors 71 upon the intention of the user.

It is possible to switch the states of the connectors 71 by various methods. For example, it is possible to switch the states of the connectors 71 using an actuator. In this example, for example, a switch connected to a controller configured or programmed to control the actuator may be provided as the operation member. When the actuator is provided, the operation member may not be necessarily provided. For example, when the batteries 30 are likely to be attached and detached (for example, when the motor control unit is turned off), the controller configured or programmed to control the actuator preferably brings the connectors 71 into the lock state. The controller preferably brings the connectors 71 into the unlock state when the motor control unit is turned on.

A mechanism (hereinafter, referred to as a transmission mechanism) may be provided to transmit the movement of the user-operable operation member to the connectors 71, and the states of the connectors 71 may be switched when the user moves the operation member. In this example, the operation member is arranged to move between two pre-set positions, the connectors 71 are brought into the lock state when the operation member is located at a first position, and the connectors 71 are brought into the unlock state when the operation member is located at a second position. An example of the operation member is a lever that is directly or indirectly connected to the connectors 71. In the electric two-wheel vehicle 1 described here, as will be described below in detail, the case cover 60 is provided as the operation member. The operation member operated by the user is preferably disposed above the batteries 30. Accordingly, the user has easy access to the operation member.

Figure 9:
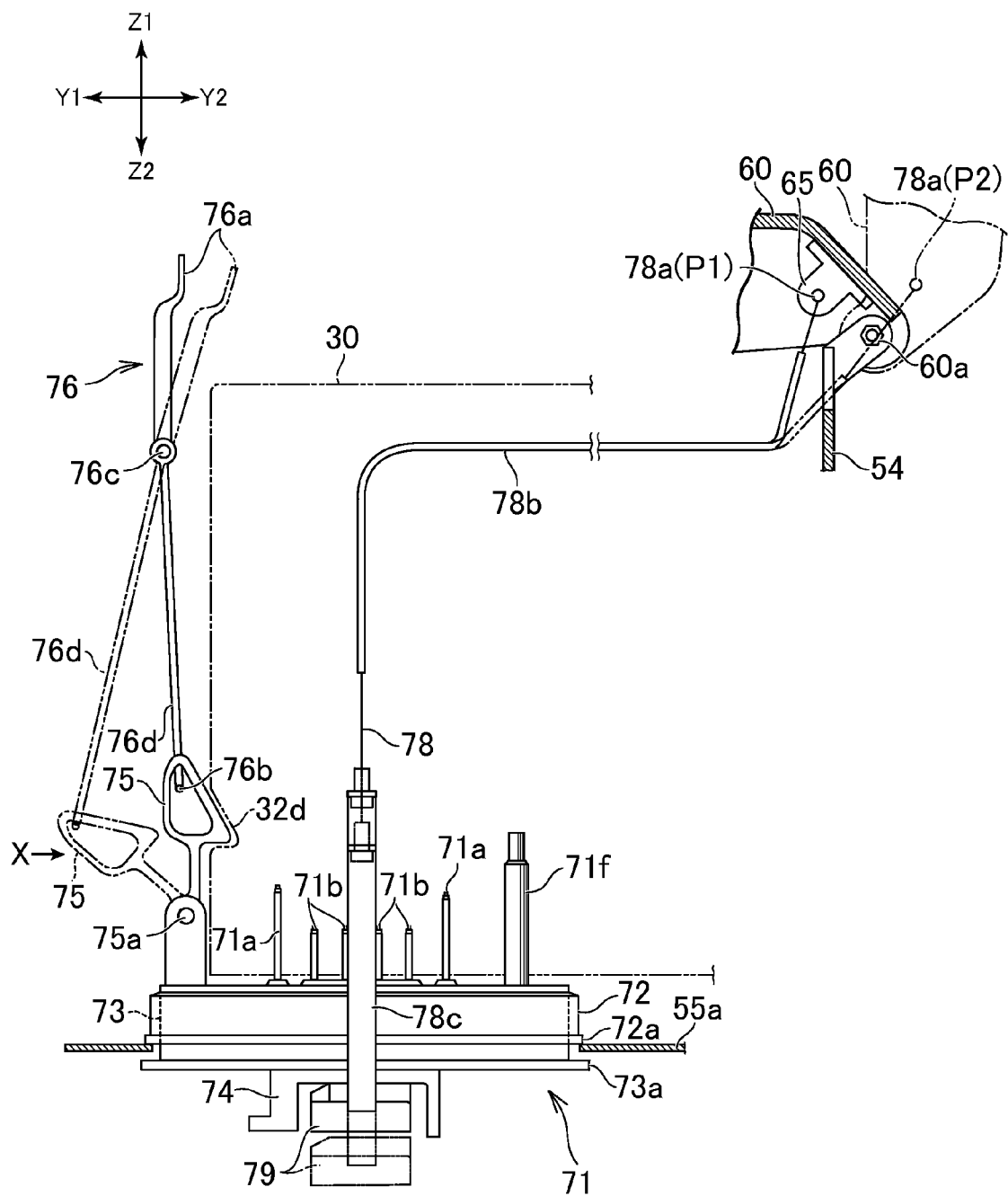
FIG. 9 is a view illustrating an example of a connector provided in the vehicle body and an example of a transmission mechanism that transmits the movement of the case cover as an operation member to the connector provided in the vehicle body.
Figure 10:
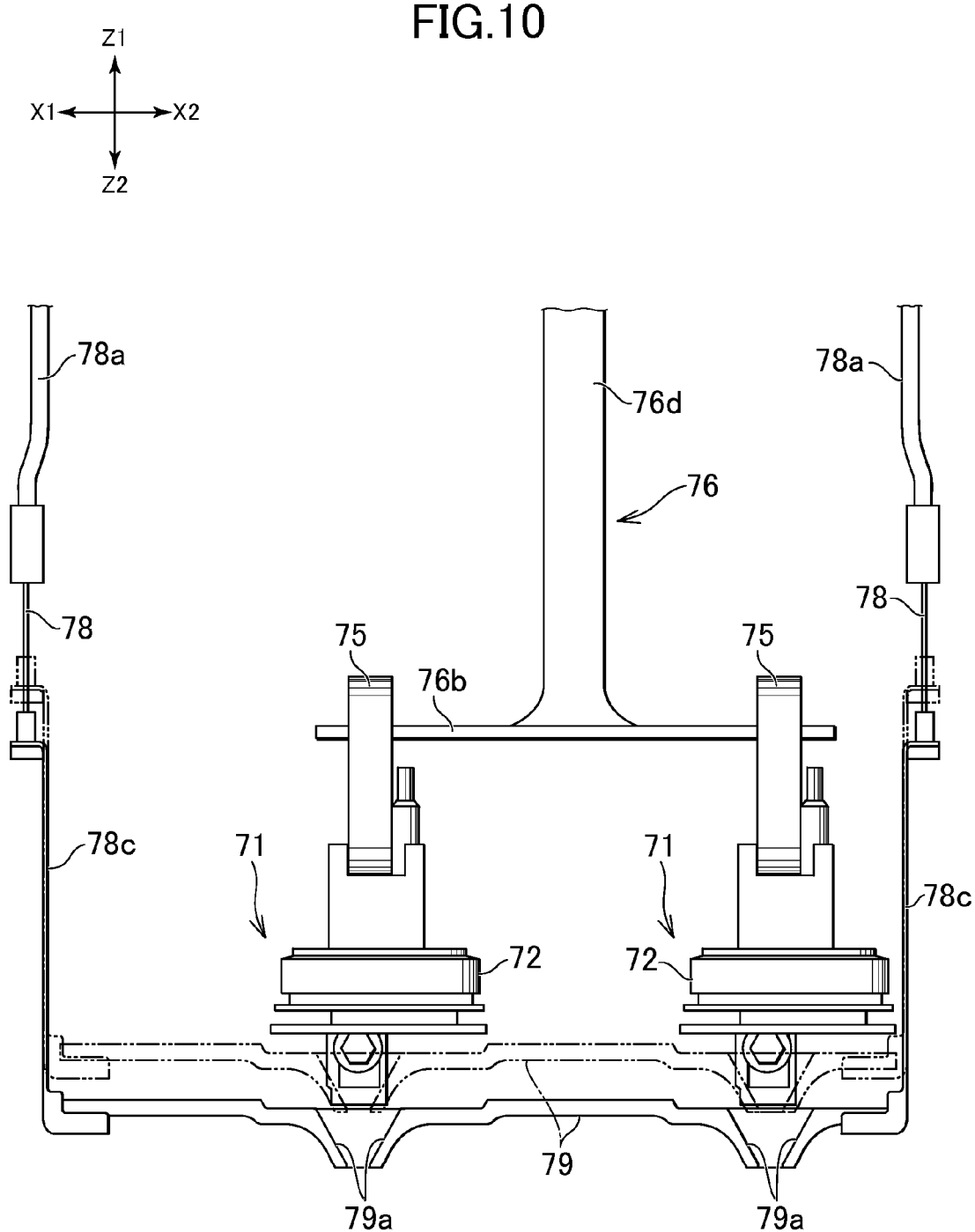
FIG. 10 is a view when the transmission mechanism is seen in a direction of arrow X illustrated in FIG. 9.
Figure 11:
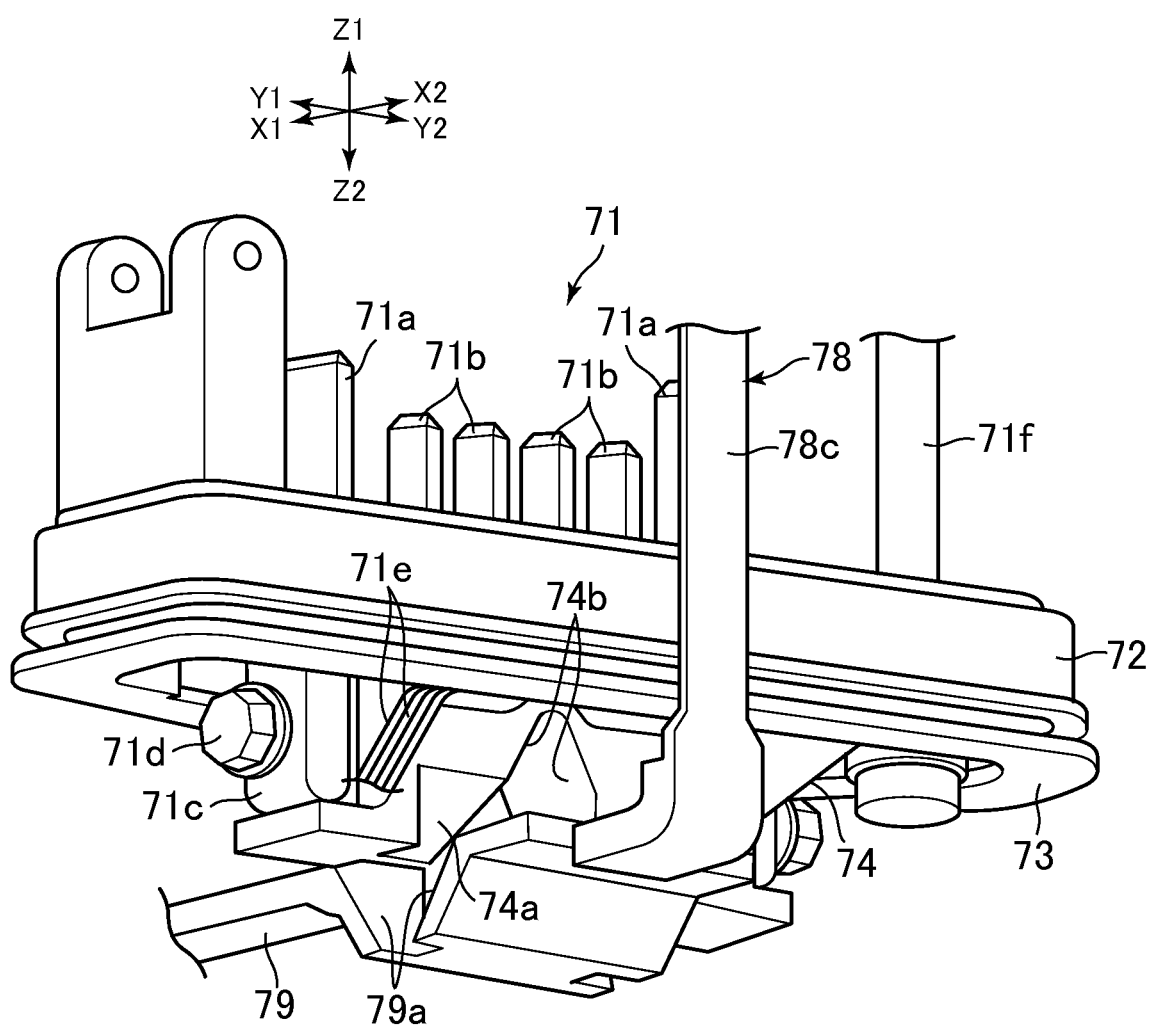
FIG. 11 is a perspective view of the connector and a lock member of the transmission mechanism.
Figure 12:
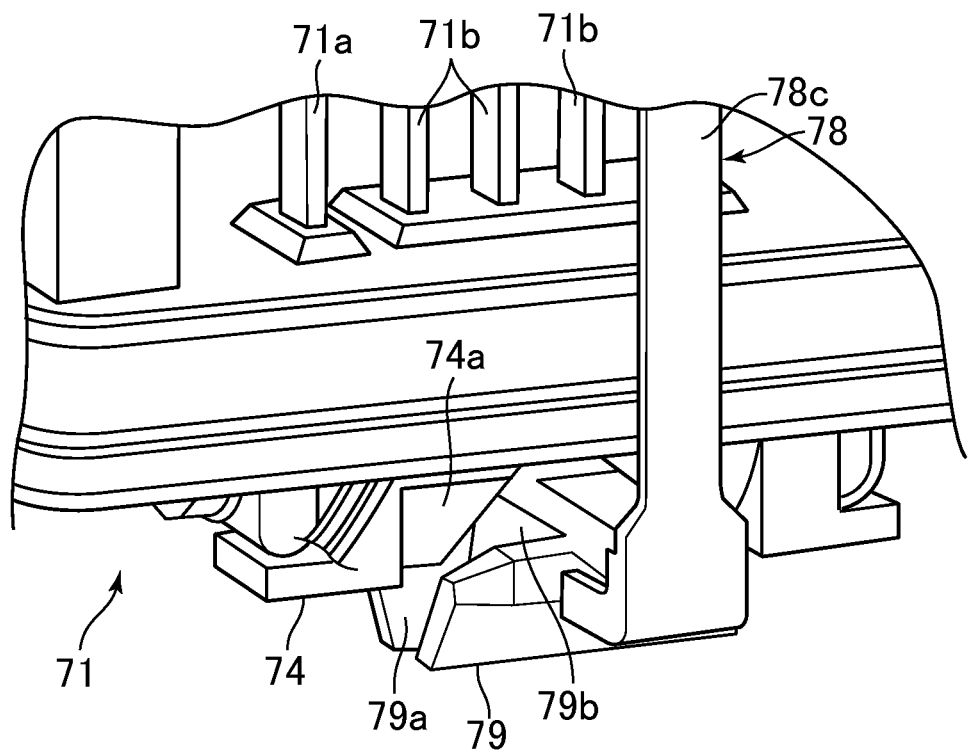
FIG. 12 is a perspective view of the connector and the lock member of the transmission mechanism.

FIG. 9 is a view illustrating the connector 71 and an example of the transmission mechanism that transmits the movement of the case cover 60 as the operation member to the connector 71. FIG. 10 is a view when the transmission mechanism is seen in a direction of arrow X illustrated in FIG. 9. FIGS. 11 and 12 are perspective views of the connector 71 and a lock member 79 of the transmission mechanism.

The connectors 71 are supported to be able to vertically move, and can vertically move to follow the vertical movement of the batteries 30. It is possible to support the connectors 71 by various methods. For example, support bases (not illustrated) to support the connectors 71 may be provided at the bottom of the bottom portion 55, and the connectors 71 may be respectively attached to the support bases so as to be able to vertically move in a pre-set range. The connectors 71 may be supported to be able to vertically move by the cover plate 55a. For example, as illustrated in FIG. 9, openings are provided in the cover plate 55a so as to correspond to the connectors 71 in size, and the connectors 71 are respectively fitted into the openings. Each of the connectors 71 includes two flanges 72a and 73a that are disposed separate from each other in the vertical direction. An edge of the opening of the plate 55a is positioned between the two flanges 72a and 73a. A distance between the flanges 72a and 73a is greater than the thickness of the plate 55a. Accordingly, the connectors 71 may be able to move vertically with respect to the cover plate 55a. The structure of the cover plate 55a, in which the connectors 71 are supported to be able to vertically move, is not limited to that in the present example, and may be changed in various forms.

Each of the connectors 71 in the example described here includes a base 72 to which the terminals 71a and 71b are fixed, and an outer circumferential member 73 that is attached to an outer circumference of the base 72. The flange 72a is provided at a lower end of the base 72. The flange 73a is provided in the outer circumferential member 73.

As illustrated in FIG. 9, the transmission mechanism in the example described here includes the lock member 79 disposed below the connector 71. The lock member 79 is movable between an engaging position and a release position. The engaging position is the position of the lock member 79 which is illustrated by a solid line in FIG. 9, and illustrated by an alternate long and two short dashes line in FIG. 10. The release position is the position of the lock member 79 which is illustrated by an alternate long and two dashes line in FIG. 9, and illustrated by a solid line in FIG. 10. When the lock member 79 is located at the engaging position, the lock member 79 is engaged with the connector 71, and the connector 71 is brought into the lock state. That is, when the lock member 79 is located at the engaging position, the lock member 79 presses the connector 71 in the vertical direction. Accordingly, when the user puts the battery 30 into the battery case 50, it is possible to prevent the connector 32 of the battery 30 from pushing the connector 71 to move downward. As a result, it is possible to smoothly connect the connector 71 and the connector 32. When the lock member 79 is located at the release position, the lock member 79 separates from the connector 71, and the connector 71 is brought into the unlock state. That is, when the lock member is located at the release position, the lock member 79 separates downward from the connector 71. For this reason, the connector 71 can vertically move in the pre-set range (for example, a range allowed by a gap between the two flanges 72a and 73a). In this structure, the lock member 79 in the example described here moves downward from the engaging position to the release position.

The lock member 79 is connected to the operation member that is moved by a user's operation. When the operation member is located at the first position, the lock member 79 is disposed at the release position, and when the operation member is located at the second position, the lock member 79 is disposed at the engaging position. As illustrated in FIG. 9, the case cover 60 is preferably used as the operation member. The case cover 60 is connected to the lock member 79 via a wire 78. The case cover 60 is configured to move about the shaft portion 60a between a closed position (the first position) and an open position (the second position). The open position is the position of the case cover 60 which is illustrated by an alternate long and two dashes line in FIG. 9. The closed position is the position of the case cover 60 which is illustrated by a solid line in FIG. 9. When the case cover 60 is located at the closed position, the lock member 79 is disposed at the release position. When the case cover 60 is located at the open position, the lock member 79 is lifted upward via the wire 78, and is disposed at the engaging position. In this structure, when the rider opens the case cover 60 for the attachment and detachment of the battery 30, the connector 71 is brought into the lock state. When the rider closes the case cover 60 so that the vehicle is configured to move, the connector 71 is brought into the unlock state.

For example, a tube 78b of the wire 78 is fixed to the inner surface of the battery case 50. In the example illustrated in FIGS. 9 and 10, one end portion of the wire 78 is fixed to an end portion of the lock member 79 via a rod 78c extending in the vertical direction. The connection structure between the wire 78 and the lock member 79 is not limited to that in the present example, and may be appropriately changed.

As described above, the plurality of batteries 30 are disposed inside the battery case 50 in the example described here. The bottom portion 55 of the battery case 50 is provided with the plurality of connectors 71 that are respectively connected to the connectors 32 of the plurality of batteries 30. The transmission mechanism transmits the movement of the case cover 60 to the plurality of connectors 71. That is, when the case cover 60 is disposed at the open position, the transmission mechanism brings the plurality of connectors 71 into the lock state, and when the case cover 60 is disposed at the closed position, the transmission mechanism brings the plurality of connectors 71 into the unlock state.

The battery case 50 in the example described here accommodates two batteries 30 that are aligned in the lateral direction. The bottom portion 55 of the battery case 50 is provided with two connectors 71 that are aligned in the lateral direction (refer to FIG. 3). As illustrated in FIG. 10, the lock member 79 is positioned below the two connectors 71. The lock member 79 extends in the lateral direction, and two wires 78 are respectively connected to the one end portion and the opposite end portion of the lock member 79. The two wires 78 are attached to the case cover 60. In this structure, when the case cover 60 is disposed at the open position, and the lock member 79 is disposed at the engaging position, the lock member 79 presses the two connectors 71 upward. As a result, the two connectors 71 are brought into the lock state. When the case cover 60 is disposed at the closed position, and the lock member 79 is disposed at the release position, the lock member 79 separates downward from the two connectors 71. As a result, the two connectors 71 are brought into the unlock state. Since a single lock member 79 is disposed below the two connectors 71, it is possible to transmit the movement of the case cover 60 to the two connectors 71. The transmission mechanism may not necessarily include the lock member 79. In this case, the connector 71 may include a portion to which the wire 78 is connected.

The lock member 79 preferably limits the movement of the connector 71 in a direction perpendicular or substantially perpendicular to the movement direction of the connector 71 which is caused by the oscillation of the battery 30. In the example described here, the connector 71 moves vertically due to the oscillation of the battery 30. Accordingly, the lock member 79 preferably limits the movement of the connector 71 in the front-rear and lateral directions. By virtue of this structure, it is possible to smoothly fit the terminals 71a and 71b of the connector 71 into the terminals 32a and 32b of the connector 32 of the battery 30, respectively.

As illustrated in FIG. 11, a lower portion of the connector 71 in the example described here is provided with an engaging member 74. The engaging member 74 includes two facing surfaces 74b that face each other in the front-rear direction. The two facing surfaces 74b are inclined such that a gap between the two facing surfaces 74b gradually increases downward. In contrast, as illustrated in FIG. 12, the lock member 79 includes a fitting portion 79b that is fitted into the gap between the two facing surfaces 74b. The fitting portion 79b includes an inclined outer surface that conforms to the shapes of the two facing surfaces 74b. When the lock member 79 is disposed at the engaging position, the fitting portion 79b and the facing surfaces 74b limit the movement of the connector 71 in the front-rear direction. The shape of each of the lock member 79 and the engaging member 74 is not limited to that in the present example. For example, two facing surfaces may be provided in the lock member 79, and the engaging member 74 may be provided with a fitting portion that is fitted into a gap between the facing surfaces.

As illustrated in FIG. 11, in the lock member 79 in the example described here, two facing surfaces 79a are respectively provided on front and rear sides of the fitting portion 79b, and face each other in the lateral direction. The two facing surfaces 79a are inclined such that a gap between the two facing surfaces 79a decreases downward. In contrast, the engaging member 74 includes a fitting portion 74a that is fitted into the gap between the two facing surfaces 79a. The fitting portion 74a has an inclined outer surface that conforms to the shapes of the two facing surfaces 79a. When the lock member 79 is disposed at the engaging position, the fitting portion 74a and the facing surfaces 79a limit the lateral movement of the connector 71. The shape of each of the lock member 79 and the engaging member 74 is not limited to that in the present example. For example, two facing surfaces may be provided in the engaging member 74, and the lock member 79 may be provided with a portion that is fitted into a gap between the facing surfaces.

As illustrated in FIG. 11, a lower portion 71c of the power supply terminal 71a extends downward beyond the base 72. An electrical wire connected to the motor control unit 29 is connected to the lower portion 71c via a bolt 71d, for example. An electrical wire 71e extends downward from the signal terminal 71b beyond the base 72. The electrical wire 71e is also connected to the motor control unit 29.

As described above, the case cover 60 is configured to move about the shaft portion 60a between the open and closed positions. An end portion 78a of the wire 78 is connected to the inner surface of the case cover 60. As illustrated in FIG. 9, for example, the end portion 78a of the wire 78 is attached to an attachment member 65 fixed to the inner surface of the case cover 60. When the case cover 60 is located at the closed position, a connection position (P1) between the end portion 78a of the wire 78 and the case cover 60 is positioned to the front of the shaft portion 60a. The wire 78 extends downward from the connection position (P1) and is positioned further forward than the shaft portion 60a. For this reason, when the case cover 60 moves from the closed position to the open position, the wire 78 is pulled upward. As a result, the lock member 79 moves from the release position to the engaging position. In contrast, when the case cover 60 is located at the open position, a connection position (P2) between the end portion 78a of the wire 78 and the case cover 60 is positioned farther rearward than the shaft portion 60a. The wire 78 extends forward and downward from the connection position (P2) while passing a position below the shaft portion 60a. That is, when the case cover 60 moves between the open and closed positions, the connection positions (P1 and P2) are set so that the wire 78 goes through the position of the shaft portion 60a. By virtue of the connection position (P2), it is possible to prevent the pulling force of the wire 78 from generating a force to close the case cover 60 when the case cover 60 is located at the open position.

As described above, the batteries 30 are capable of being vertically attached to, and detached from, the vehicle body. The terminals 71a and 71b of the connector 71 are vertically fitted into the terminals 32a and 32b of the connector 32 of the battery 30, respectively. An engaging member is preferably provided in one of the connector 71 and the battery 30 so as to limit a relative vertical movement between the connector 71 and the connector 32. The engaging member is configured to move between an engaging position and a release position. When the engaging member is located at the engaging position, the engaging member engages with the other of the connector 71 and the battery 30, and limits the upward separation of the battery 30 from the connector 71. When the engaging member is located at the release position, the engaging member releases the other of the connector 71 and the battery 30, and allows the battery 30 to separate upward from the connector 71. By virtue of the engaging member, it is possible to improve connection stability between the connector 71 and the connector 32 while the vehicle is travelling.

In the example illustrated in FIG. 9, the connector 71 is provided with an engaging member 75. The engaging member 75 is configured to move in a direction perpendicular or substantially perpendicular to the vertical direction. The engaging member 75 in the example illustrated in FIG. 9 is configured to move, in the front-rear direction, about a shaft portion 75a positioned in a lower portion of the engaging member 75. In contrast, an engaged portion 32d (illustrated by an alternate long and two short dashes line in FIG. 9, and refer to FIG. 16) is provided in a front surface of the battery 30, and the engaging member 75 is fitted into the engaged portion 32d. Accordingly, when the engaging member 75 is disposed at an engaging position where the engaging member 75 is fitted into the engaged portion 32d, the battery 30 is restricted from separating upward from the connector 71. When the engaging member 75 separates forward from the engaged portion 32d, and is disposed at a release position, the battery 30 can separate upward from the connector 71.

The electric two-wheel vehicle 1 is provided with an operation member 76 for moving the engaging member 75 in the front-rear direction. For example, the operation member 76 is a user-operable member. An upper portion of the operation member 76 in the example illustrated in FIG. 9 is provided with an operated portion 76a operated by the user. The operated portion 76a is preferably disposed upward of the upper surface of the battery 30. Accordingly, the user has easy access to the operated portion 76a. A lower portion of the operation member 76 is provided with an engaging portion 76b that is engaged with the engaging member 75 so as to be able to move the engaging member 75 in the front-rear direction. An example of the operation member 76 is a lever, and the operation member 76 includes a shaft portion 76c between the engaging portion 76b and the operated portion 76a. Accordingly, when the operated portion 76a moves forward, the engaging portion 76b moves rearward about the shaft portion 76c, and the engaging member 75 is fitted into the engaged portion 32d of the battery 30. In contrast, when the operated portion 76a moves rearward, the engaging portion 76b moves forward about the shaft portion 76c, and the engaging member 75 separates from the engaged portion 32d of the battery 30. For example, the shaft portion 76c is supported by a support member provided in the inner surface of the battery case 50.

The engaging member 75 is not limited to that in the above-mentioned example. For example, the engaging member 75 may be disposed to engage with a side surface or a rear surface of the battery 30. The operation member 76 may not be a lever.

As described above, the electric two-wheel vehicle 1 in the example described here are provided with the plurality of connectors 71 that are aligned in the lateral direction. As illustrated in FIG. 10, the plurality of connectors 71 are respectively provided with the engaging members 75. The lower portion of the operation member 76 includes the plurality of engaging portions 76b that engage with the engaging members 75 of the plurality of connectors 71, respectively. The electric two-wheel vehicle 1 in the example described here preferably is provided with two connectors 71. The operation member 76 illustrated in FIG. 10 includes the two engaging portions 76b that respectively extend rightward and leftward from a lower end of a rod 76d extending downward from the shaft portion 76c.

Figure 13:
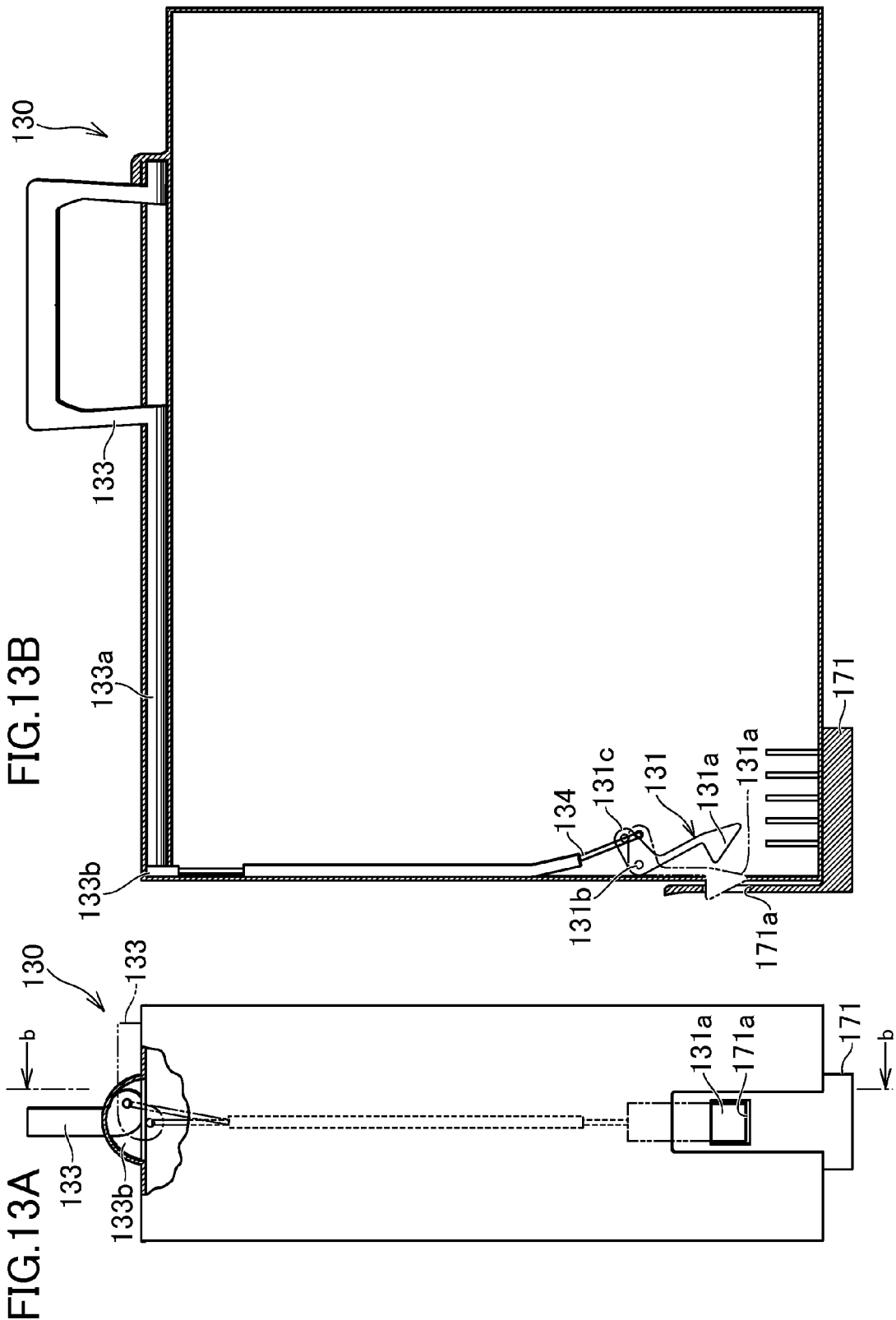
FIGS. 13A and 13B are views illustrating a modification example of a mechanism that limits the movement of a battery with respect to the connector.

The structure, in which the movement of the battery 30 is limited with respect to the connector 71, is not necessarily limited to the above-mentioned example. For example, the battery 30 may be provided with an engaging member that is configured to move in the direction perpendicular or substantially perpendicular to the vertical direction. FIGS. 13A and 13B are schematic views illustrating a battery 130 with such a configuration. FIG. 13A is a front view of the battery 130, and FIG. 13B is a cross-sectional view taken along line b-b illustrated in FIG. 13A.

A lower portion of the battery 130 includes an engaging member 131. The engaging member 131 includes a hook portion 131a. The engaging member 131 is arranged in order for the hook portion 131a to be able to move in the front-rear direction about a shaft portion 131b. In FIGS. 13A and 13B, the battery case 50 is provided with a connector 171. The connector 171 is provided with an engaged portion 171a such as a concave portion or a hole, into which the hook portion 131a of the engaging member 131 can be fitted.

The engaging member 131 of the battery 130 is preferably provided to move while connected with an operation member operated for the attachment and detachment of the battery 130 by the user. The operation member is configured to move between an engaging position at which the engaging member 131 engages with an engaged portion 171a of the connector 171, and a release position at which the engagement is released. Accordingly, it is possible to make engagement between the engaging member 131 of the battery 130 with the engaged portion 171a of the connector 171, and allow release there between via a simple operation.

For example, the battery 130 is provided with a carrying handle 133 as the operation member grasped by the user, and the carrying handle 133 and the engaging member 131 are connected to each other such that the movement of the carrying handle 133 is linked with the movement of the engaging member 131.

In the example illustrated in FIGS. 13A and 13B, the carrying handle 133 includes a shaft portion 133a. The carrying handle 133 can turn about the shaft portion 133a. Specifically, the carrying handle 133 is configured to move between an erect posture with respect to an upper surface of the battery 130 (the posture of the carrying handle 133 illustrated by a solid line in FIGS. 13A and 13B, hereinafter, referred to as a usage posture) and a lying posture with respect to the upper surface of the battery 130 (the posture of the carrying handle 133 illustrated by an alternate long and short two dashes line in FIG. 13B, hereinafter, referred to as a non-usage posture). The shaft portion 133a and the engaging member 131 are connected to an operation portion 131c of the engaging member 131 via a connection member 134 such as a wire. Specifically, the shaft portion 133a and the engaging member 131 are connected to the operation portion 131c such that the engaging member 131 is disposed at the release position when the carrying handle 133 is in the usage posture, and the engaging member 131 is disposed at the engaging position when the carrying handle 133 is in the non-usage posture. In the present example, an end portion 133b of the shaft portion 133a is connected to the operation portion 131c of the engaging member 131 via the connection member 134. The operation portion 131c extends from the shaft portion 133a in a radial direction (rearward in FIG. 13A) of the shaft portion 133a. A connection position between the connection member 134 and the shaft portion 133a is separate from a rotary center of the shaft portion 133a. When the carrying handle 133 is in the usage posture, the operation portion 131c is pulled upward by the connection member 134, and the engaging member 131 is disposed in the release position. In contrast, when the carrying handle 133 is in the non-usage posture, the operation portion 131c is brought down, and the engaging member 131 is disposed in the engaging position. In this structure, for example, the engaging member 131 is pressed toward the engaging position by a spring or the like.

Figure 14:
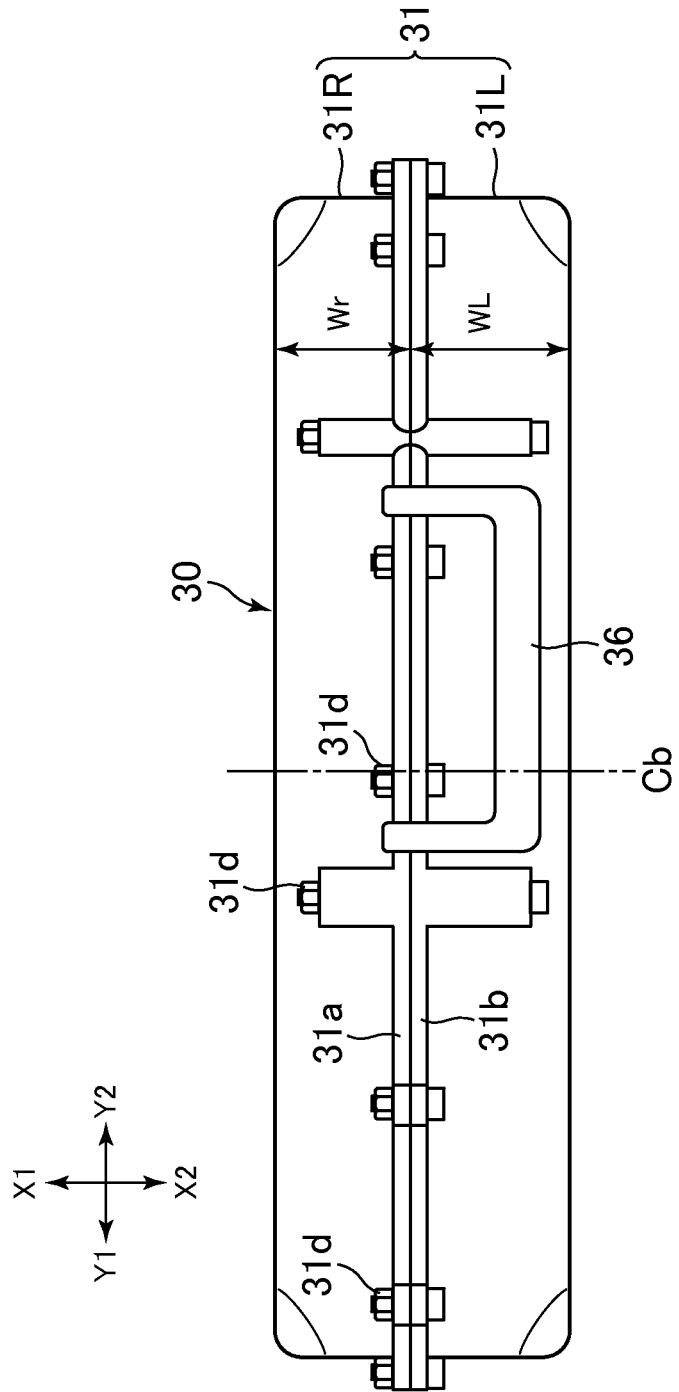
FIG. 14 is a plan view of the battery.
Figure 15:
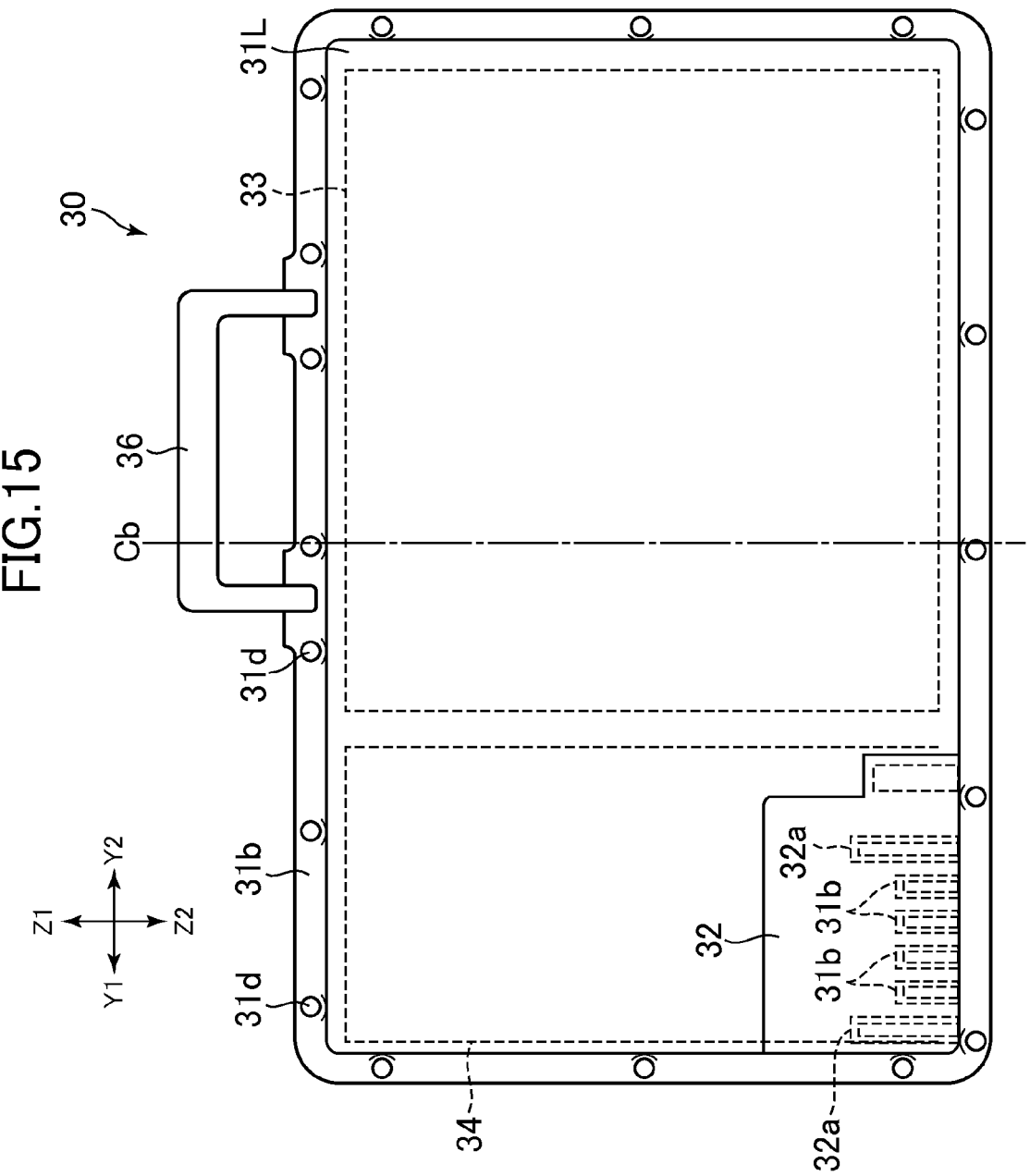
FIG. 15 is a side view of the battery.
Figure 16:
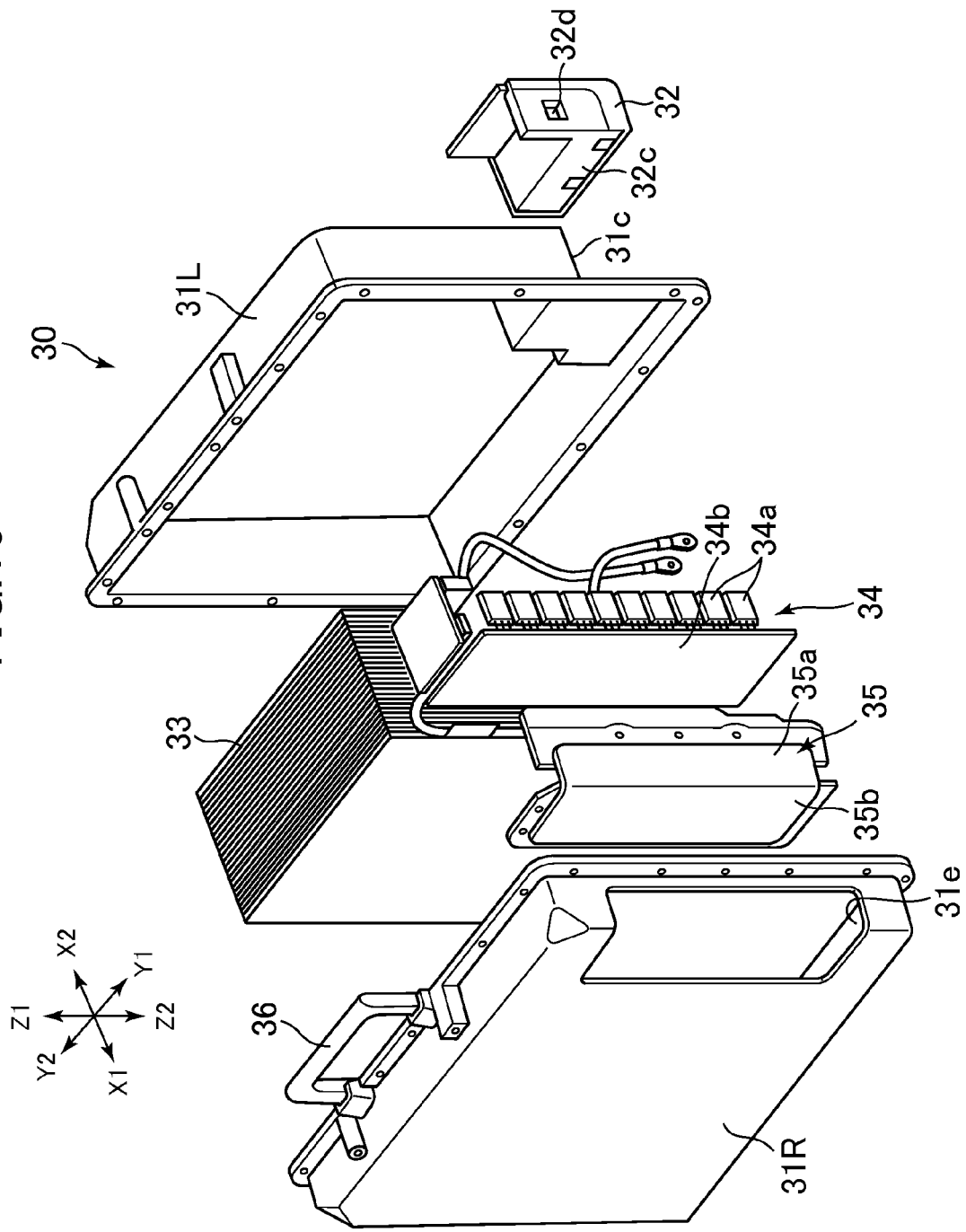
FIG. 16 is an exploded perspective view of the battery.

FIG. 14 is a plan view of the battery 30. FIG. 15 is a side view of the battery 30. FIG. 16 is an exploded perspective view of the battery 30. As illustrated in FIGS. 14 and 15, the battery 30 in the example described here preferably has a rectangular or substantially rectangular parallelepiped shape that is slender in the front-rear direction. The battery 30 includes a housing 31. Battery cells 33 are disposed inside the housing 31. A battery management controller 34 (hereinafter, the battery management controller is simply referred to as a controller) configured or programmed to manage the battery cells 33 is disposed inside the housing 31. The controller 34 monitors the states of the battery cells 33, for example, the voltage or temperature thereof, and controls the charging and discharging of the battery 30. The controller 34 includes a communication module configured to transmit and receive the states of the battery cells 33 to the motor control unit 29 mounted on the vehicle body.

The controller 34 is disposed to the front or the rear of the battery cells 33. In the example illustrated in FIGS. 14 and 15, the controller 34 is disposed to the front of the battery cells 33. As illustrated in FIG. 16, the housing 31 includes a right housing half body 31R and the left housing half body 31L that define right and left portions of the housing 31, respectively, and are assembled together in the lateral direction. Since the controller 34 is disposed to the front or the rear of the battery cells 33, it is possible to reduce the lateral (direction of the vehicle width) width of the battery 30. The housing 31 is defined by the right housing half body 31R and the left housing half body 31L that are assembled together in the lateral direction. For this reason, tightening members 31d for fixing the housing half bodies 31R and 31L together, for example, bolts are not required to be provided on right and left sides of the battery 30, and thus it is possible to further reduce the lateral width of the battery 30.

As illustrated in FIG. 16, the right housing half body 31R preferably has a box shape that is open in the leftward direction, and the left housing half body 31L preferably has a box shape that is open in the rightward direction. The right housing half body 31R and the left housing half body 31L include flanges 31a and 31b on the edges thereof facing each other, respectively. The flanges 31a and 31b are fixed together with the tightening members 31d. As illustrated in FIG. 15, the flanges 31a and 31b are preferably provided on the entire respective circumferences of the housing half bodies 31R and 31L. That is, the flanges 31a and 31b are preferably provided on front, upper, rear, and lower sides of the housing half bodies 31R and 31L, respectively. As described above, the battery 30 is interposed between the upper springs 61 of the case cover 60 and the lower springs 57. By virtue of the flanges 31a and 31b, it is possible to increase the strength of the housing 31 against a force that an upper surface of the housing 31 receives from the upper springs 61, and a force that a lower surface of the housing 31 receives a force from the lower springs 57. The housing half bodies 31R and 31L may not be provided with the respective flanges 31a and 31b.

As described above, the battery 30 can be vertically attached to, and detached from, the vehicle body. That is, the electric two-wheel vehicle 1 in the example described here includes the battery case 50 with an open top, and thus the battery 30 can be vertically attached to, and detached from, the vehicle body. The housing half body 31R and the housing half body 31L are assembled together in the lateral direction. For this reason, it is possible to reduce the lateral width of the battery case 50, that is, the vehicle width. When the housing is defined by two housing half bodies that are assembled together in the vertical direction, the opening of the battery case 50 is required to have an enough lateral width to allow tightening members to fix the two housing half bodies together to pass through the opening of the battery case 50. Since the housing half body 31R and the housing half body 31L are assembled together in the lateral direction, the opening of the battery case 50 is not required to have a large width to allow the tightening members to pass through the opening of the battery case 50. As a result, it is possible to reduce the lateral width of the battery case 50.

As illustrated in FIG. 16, the controller 34 includes a plurality of switching elements (for example, field effect transistors (FETs)) 34a to control the charging and discharging of the battery 30. The battery 30 preferably includes a heat radiating member 35 to cool the switching elements 34a. As described above, the battery 30 includes the connector 32. As illustrated in FIG. 16, in the connector 32 in the example illustrated here, the terminals 32a and 32b are held by an insulator 32c. The heat radiating member 35, the connector 32, and the controller 34 are positioned in the same direction with respect to the battery cells 33. In the battery 30 in the example described here, the heat radiating member 35, the connector 32, and the controller 34 are positioned to the front of the battery cells 33.

One housing half body of the right housing half body 31R and the left housing half body 31L preferably has a lateral width greater than that of the other housing half body. At least one of the heat radiating member 35 and the connector 32 is disposed in one housing half body having the greater width. Accordingly, it is possible to increase the degree of freedom in the layout of the heat radiating member 35 and the connector 32. In the battery 30 in the example described here, the left housing half body 31L has a width WL greater than a width Wr of the right housing half body 31R (refer to FIG. 14). As illustrated in FIG. 16, in the example of the battery 30, the connector 32 is provided in the left housing half body 31L, and the heat radiating member 35 is provided in the right housing half body 31R. Accordingly, a connector with a large width can be utilized as the connector 32.

As illustrated in FIG. 15, the terminals 32a and 32b of the connector 32 are preferably disposed in line in the front-rear direction. Accordingly, it is easy to prevent an increase of the lateral width of the battery 30. The layout of the heat radiating member 35 and the connector 32 is not limited to that in the present example. For example, the heat radiating member 35 may be disposed in one housing half body having the greater width, and the connector 32 may be disposed in the other housing half body. In this example, it is easy to increase the size of the heat radiating member 35. Both of the heat radiating member 35 and the connector 32 may be disposed in one housing half body having the greater width.

As illustrated in FIG. 16, in the example of the battery 30, a concave portion 31c is provided in a lower portion of the left housing half body 31L. The connector 32 is fitted into the concave portion 31c and is attached to the left housing half body 31L. The concave portion 31c preferably has a size corresponding to the connector 32. The concave portion 31c is provided at a corner of the lower portion of the left housing half body 31L, and the connector 32 defines the front, lower, and side surfaces of the battery 30. The connector 32 is provided with the engaged portion 32d into which the engaging member 75 of the connector 71 is fitted. Accordingly, it is possible to improve connection stability between the connector 32 and the connector 71. As illustrated in FIG. 15, each of the flanges 31a and 31b preferably includes a portion that further protrudes downward than a lower surface (surface from which the terminals 32a and 32b are exposed) of the connector 32. Accordingly, it is possible to protect the connector 32 by virtue of the flanges 31a and 31b.

As described above, in the battery 30 in the example described here, the controller 34 is disposed to the front of the battery cells 33. In the present example, as illustrated in FIG. 16, the plurality of switching elements 34a are preferably attached to a foremost portion of a substrate 34b. Accordingly, it is possible to secure a distance between the battery cells 33 and the switching elements 34a. The controller 34 may be disposed to the rear of the battery cells 33. For example, the plurality of switching elements 34a are preferably attached to a rearmost portion of the substrate 34b.

As illustrated in FIG. 16, in the present example, the plurality of switching elements 34a are vertically disposed in line. The switching elements 34a at a low position are preferably disposed from the connector 32 in the lateral direction. It is possible to reduce the vertical height of the battery 30 by virtue of this layout.

As illustrated in FIG. 16, the heat radiating member 35 in the example described here includes a portion 35a that is disposed to the front of the switching elements 34a. The heat radiating member 35 extends vertically along the plurality of switching elements 34a. An opening 31e is provided in the front surface of the housing 31, and the heat radiating member 35 is fitted into the opening 31e of the housing 31. Accordingly, it is possible to thermally expose the heat radiating member 35 from the front surface of the battery 30. By virtue of the layout of the heat radiating member 35, it is possible to ensure a space inside the battery case 50 for cooling the heat radiating member 35 while preventing an increase in vehicle width by increasing the size of the battery case 50 in the forward direction. The heat radiating member 35 is preferably made of metal. A protective seal may be pasted on the heat radiating member 35, or painting may be applied to the heat radiating member 35. Here, the protective seal and the paining may have insulating properties. In this case, the heat radiating member 35 is thermally exposed from the front surface of the battery 30. The seal or the painting may not be necessarily applied. Even in this case, a front surface of the heat radiating member 35 is exposed from the front surface of the battery 30. As described above, the controller 34 may be disposed to the rear of the battery cells 33. In this example, an opening is provided in the rear surface of the housing 31, and the heat radiating member 35 is fitted into the opening of the housing 31. Accordingly, it is possible to thermally expose the heat radiating member 35 from the rear surface of the battery 30.

The opening 31e is preferably provided in one housing half body of the two housing half bodies 31R and 31L. That is, the other housing half body does not include the edge for the opening 31e. Accordingly, it is possible to reduce the tolerances of the opening 31e and the heat radiating member 35, compared with a structure where the opening 31e is provided over both of the housing half bodies 31R and 31L, and improve the sealing properties of the housing 31. As illustrated in FIG. 16, in the example of the battery 30, the opening 31e is provided in the right housing half body 31R. The left housing half body 31L does not include the edge for the opening 31e. The opening 31e is not necessarily limited to that in the present example. For example, concave portions are respectively provided in the edges of the two housing half bodies 31R and 31L, and the opening 31e may be formed by assembling the two concave portions together.

In the example illustrated in FIG. 16, the opening 31e is provided in the front surface of the housing 31, and another surface of the housing 31 connecting to the front surface. Specifically, the opening 31e is provided in the front and side surfaces of the housing 31. Accordingly, the heat radiating member 35 is thermally exposed from the front and side surfaces of the battery 30. It is possible to increase the exposed area of the heat radiating member 35 without increasing the lateral width of the battery 30 by virtue of this structure. As illustrated in FIG. 16, in the example of the battery 30, the opening 31e is provided in the front and side surfaces of the right housing half body 31R having a small width. In the battery 30 illustrated here, since the heat radiating member 35 is attached to the right housing half body 31R having a small width, but the front and left surfaces of the right housing half body 31R are used, it is possible to secure the exposed area of the heat radiating member 35. The heat radiating member 35 defines the front and right side surfaces of the battery 30.

The heat radiating member 35 in the example described here preferably has an L-shaped cross section. That is, the heat radiating member 35 includes the portion 35a that defines the front surface of the battery 30, and a portion 35b that is bent with respect to the portion 35a and defines the side surface of the battery 30. An outer circumferential portion of the heat radiating member 35 is fixed to the edge of the opening 31e. By virtue of the heat radiating member 35, it is possible to reduce a space occupied in the inner space of the housing 31 by the heat radiating member 35. As a result, it is easy to dispose other components inside the housing 31.

The controller 34 includes the substrate 34b on which components such as the switching elements 34a are mounted. As illustrated in FIG. 16, the substrate 34b is preferably disposed along the side surface of the battery 30. In other words, the substrate 34b is preferably disposed along an inner surface of a side wall portion of the housing 31. It is possible to secure the proper size of the substrate 34b without increasing the lateral width of the battery 30 by virtue of the layout of the substrate 34b. In the example illustrated in FIG. 16, the substrate 34b is disposed along a side wall portion of the right housing half body 31R. The switching elements 34a are attached to the substrate 34b in a state of being erect, and aligned vertically along the front surface of the battery 30.

In the example described here, the housing half bodies 31R and 31L are preferably made of resin. When the housing half bodies 31R and 31L are molded, molding dies of a molding machine are slid in the lateral direction. As illustrated in FIGS. 14 and 15, the housing 31 in the example described here has a lateral width less than the length in the front-rear direction and vertical height of the housing 31. According, it is possible to decrease the amount of sliding of the molding dies, and thus it is possible to smoothly separate molded parts (that is, the housing half bodies 31R and 31L) from the molding dies.

As illustrated in FIGS. 14 and 15, the carrying handle 36 for the user to hold is attached to the upper surface of the housing 31. As described above, in the battery 30 in the example described here, the controller 34 is disposed to the front of the battery cells 33. In the present example, the carrying handle 36 is preferably deviated rearward with respect to a center Cb of the battery 30 in the front-rear direction. Accordingly, it is possible to prevent the battery 30 from being inclined when the user lifts the battery 30 upward.

The controller 34 may be disposed to the rear of the battery cells 33. In this case, the carrying handle 36 is preferably deviated forward with respect to the center Cb of the battery 30 in the front-rear direction.

The present invention is not limited to the above-described electric two-wheel vehicle 1, and can be changed in various forms. For example, the battery case 50 and the motor case 70 may be separate. FIGS. 17A and 17B are views illustrating an example of a battery case 150 and a motor case 170 which are separate. FIG. 17A is a side view, and FIG. 17B is a cross-sectional view taken along line b-b illustrated in FIG. 17A. In FIGS. 17A and 17B, the motor case 170 is vertically fixed to the battery case 150 using a plurality of tightening members 177 such as bolts, for example. The motor case 170 in the example illustrated in FIGS. 17A and 17B includes an upper edge 170b that extends along a lower edge of the battery case 150 in the front-rear direction. The upper edge 170b is fixed to the lower edge of the battery case 150 using the tightening members 177. It is possible to increase the number of fixing places between the motor case 170 and the battery case 150, and improve the rigidity of the motor case 170 and the battery case 150 by virtue of the upper edge 170b. In the example illustrated in FIGS. 17A and 17B, similar to the battery case 50, two batteries 30 are accommodated in the battery case 150. The beam portion 51 is disposed between the two batteries 30.

In the example illustrated in FIGS. 17A and 17B, the motor case 170 is attached to a lower side of the battery case 150, and is an accommodating portion for the electric motor 21. As described above, the battery case 150 functions as a portion of the vehicle body frame. That is, the motor case 170 is attached to a lower side of the vehicle body frame. A frame for supporting the motor case 170 is not provided on a lower side of the motor case 170. By virtue of the attachment structure of the motor case 170, it is possible to increase the axial size of the electric motor 21, and reduce the radial size of the electric motor 21 while reducing the lateral width (width of the battery case 150 in an example of the electric two-wheel vehicle described here) of the vehicle body frame. As a result, it is possible to reduce, in the front-rear direction, the size of the drive system 20 that includes the motor control unit 29 and the electric motor 21.

The number of batteries 30 accommodated in the battery case 50 may be greater than two, for example. FIGS. 18A and 18B are views illustrating a battery case 150A that can accommodate three batteries 30. FIG. 18A is a side view, and FIG. 18B is a cross-sectional view taken along line b-b illustrated in FIG. 18A. Three batteries 30 are aligned in the battery case 150A in the lateral direction. Similar to the example illustrated in FIGS. 17A and 17B, the battery case 150A and the motor case 170 are separate. The motor case 170 is vertically fixed to the battery case 150A using the tightening members 177. Even in the present example illustrated in FIGS. 18A and 18B, the upper edge 170b of the motor case 170 extends along the a lower edge of the battery case 150A in the front-rear direction. The upper edge 170b is fixed to the lower edge of the battery case 150A using the tightening members 177. In FIGS. 18A and 18B, the tightening members 177 are provided inside the battery case 150A. The positions of the tightening members 177 are not limited to those in the present example. For example, as illustrated in FIGS. 17A and 17B, the tightening members 177 may be provided outside the battery case 150. As illustrated in FIGS. 18A and 18B, in a preferred embodiment in which three batteries 30 are provided, it is preferable that the battery case 150A include two beam portions 51, and the beam portions 51 be respectively disposed between adjacent two batteries 30.

Figure 19:
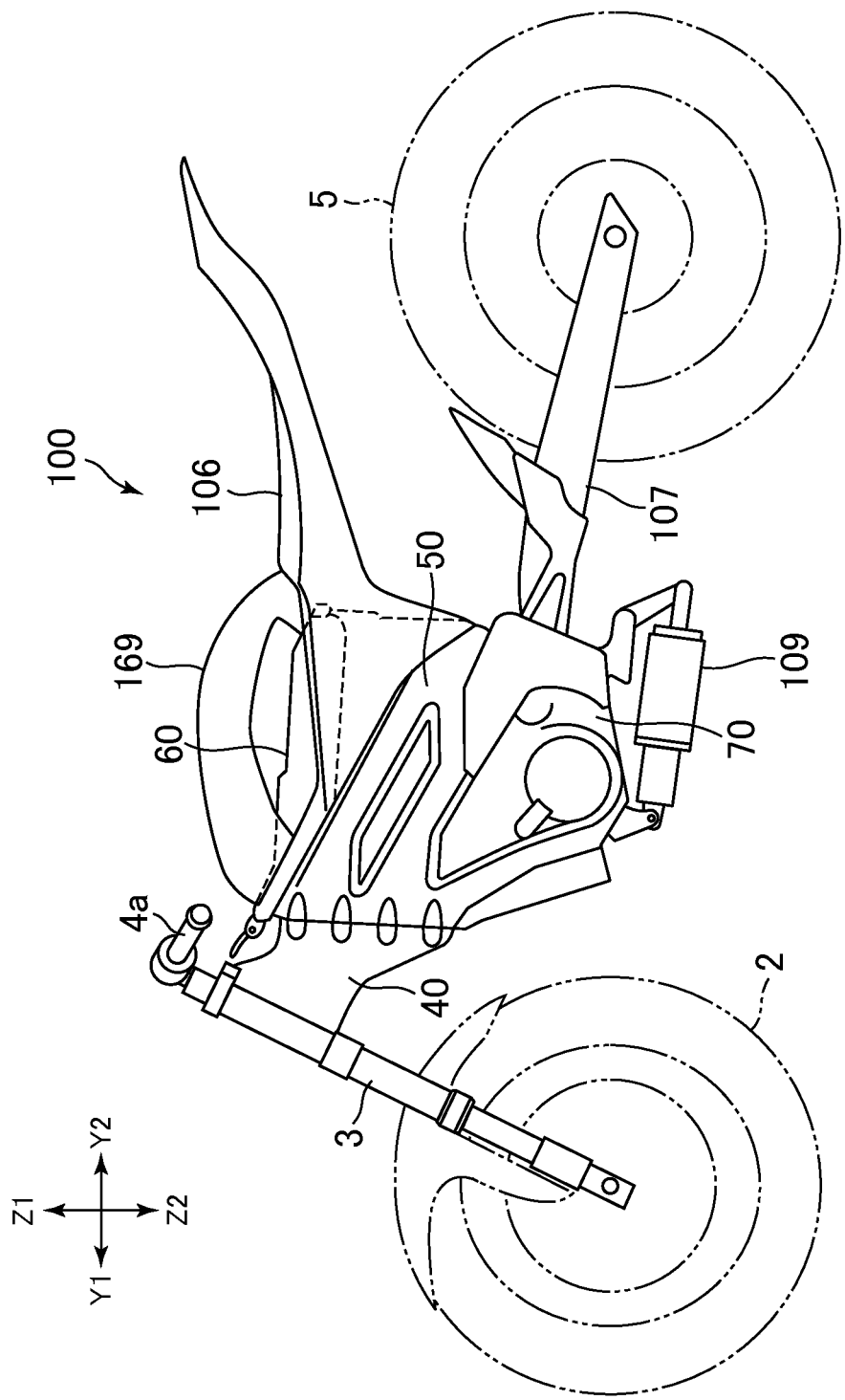
FIG. 19 is a side view illustrating another example of an electric two-wheel vehicle.

FIG. 19 is a side view illustrating an electric two-wheel vehicle 100 according to a preferred embodiment of the present invention. In FIG. 19, the same reference signs are assigned to the same elements and substantially the same places as in the above-mentioned examples. Hereinafter, compared to the electric two-wheel vehicle 1, the different points will be mainly described, and other points are the same as in the electric two-wheel vehicle 1.

Similar to the electric two-wheel vehicle 1, the electric two-wheel vehicle 100 includes the battery case 50. The battery case 50 accommodates the plurality of batteries 30. The electric two-wheel vehicle 100 includes the motor case 70. For example, the motor case 70 is integral with the battery case 50. As described above, the motor case 70 and the battery case 50 may be separate.

The electric two-wheel vehicle 100 includes a rear suspension 109. The rear suspension 109 is disposed below the motor case 70. For example, a front end of the rear suspension 109 is supported by a lower surface of the motor case 70. For example, a rear end of the rear suspension 109 is connected to a rear arm 107 via a linkage mechanism.

The electric two-wheel vehicle 100 includes an upper cover 169 that is disposed upward of the case cover 60 and covers the case cover 60. The upper cover 169 preferably extends upward. A seat 106 is disposed to the rear of the upper cover 169. The rider can place the body on the upper cover 169 by virtue of the shape and layout of the upper cover 169. For example, the upper cover 169 preferably has a shape resembling a fuel tank of a motorcycle equipped with an engine.

It is preferable that the upper cover 169 be connected to the case cover 60 via the engaging member 62 to lock the case cover 60 into the battery case 50, and can turn about the shaft 66 (refer to FIG. 8) of the engaging member 62. Accordingly, the engaging member 62 easily turns about the shaft 66. That is, the hook portion 62a of the engaging member 62 easily engages with the engaged portion 50c provided in the battery case 50, and the engagement is easily released. For example, the upper cover 169 is attached to the operation portion 62c (refer to FIG. 8) of the engaging member 62, and is integral with the operation portion 62c.

Figure 20:
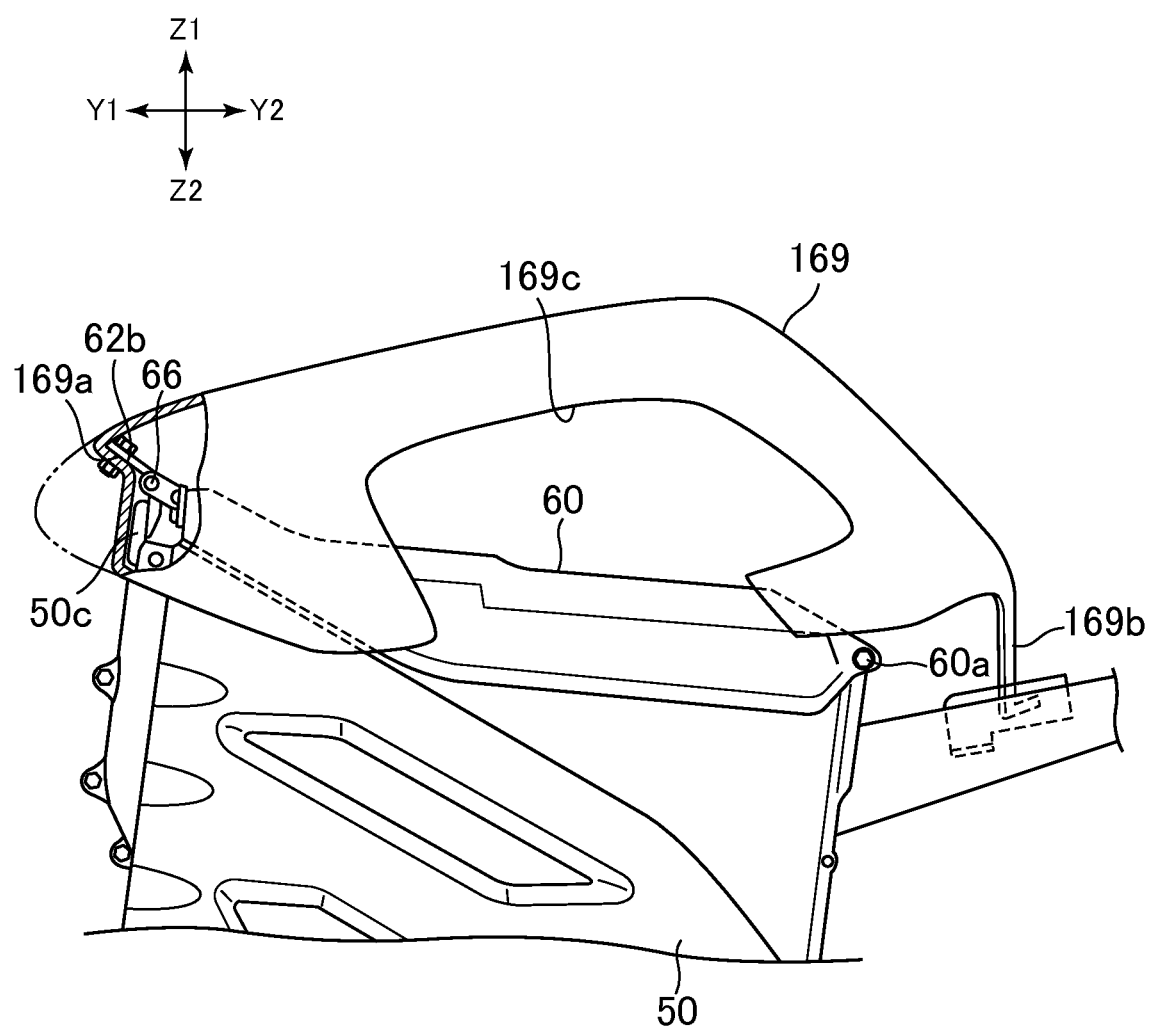
FIG. 20 is a side view illustrating a connection structure between an upper cover and the case cover of the electric two-wheel vehicle illustrated in FIG. 19.
Figure 21A:
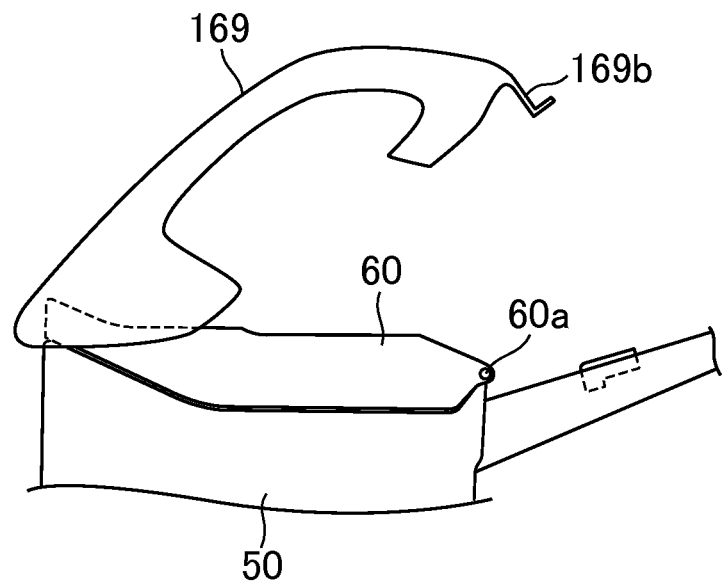
FIGS. 21A and 21B are views illustrating the movement of an upper cover and the case cover.
Figure 21B:
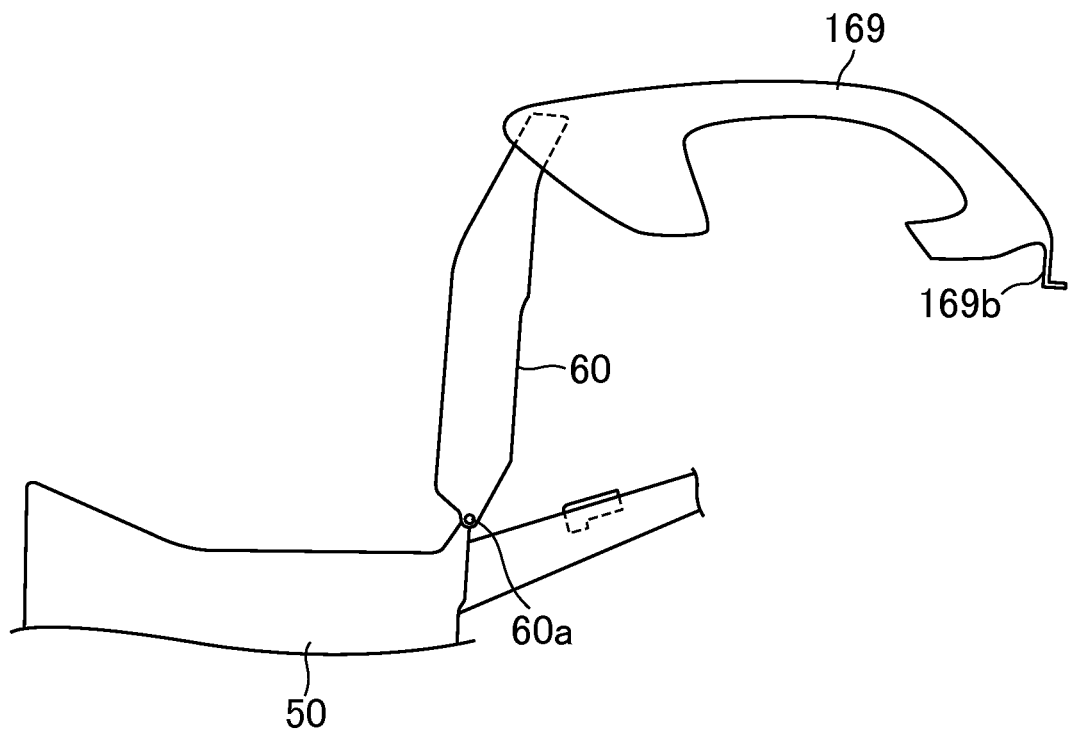

FIG. 20 is a view illustrating an example of the connection structure between the upper cover 169 and the case cover 60. FIGS. 21A and 21B are views illustrating the movement of the upper cover 169 and the case cover 60. As described above, the engaging member 62 is provided at the front end of the case cover 60. In an example, a front portion of the upper cover 169 includes an attachment portion 169a that is attached to the operation portion 62c of the engaging member 62 using tightening members such as bolts. Accordingly, the upper cover 169 can turn about the shaft 66 of the engaging member 62 together with the engaging member 62. The structure of the upper cover 169 is not limited to that in the present example. For example, the upper cover 169 may be integral with the engaging member 62 so as to be able to turn about the shaft 66. For example, a rear portion of the upper cover 169 includes an engaging portion 169b that can be locked and unlocked with respect to the vehicle body. For example, the engaging portion 169b can be switched between a lock state and an unlock state via a key operation performed by the rider. A lower edge 169c of the upper cover 169 illustrated in FIG. 20 is bent to extend upward, and the case cover 60 is partially exposed. The shape of the upper cover 169 is not limited to that in the present example, and may be changed in various forms.

For example, the case cover 60 may be opened and closed in the following manner. The locking of the engaging portion 169b of the upper cover 169 is released via a key operation, and the engaging portion 169b is brought into the unlock state. As illustrated in FIG. 21A, the upper cover 169 turns upward and forward about the shaft 66. Accordingly, the hook portion 62a of the engaging member 62 is disconnected from the engaged portion 50c of the battery case 50. Thereafter, the case cover 60 together with the upper cover 169 turns upward and rearward about the shaft portion 60a provided in the rear portion of the case cover 60.

The upper cover 169 may not necessarily include the above-mentioned structure. That is, the upper cover 169 may be attached to the case cover 60 using tightening members such as bolts, and may move about the shaft portion 60a.

Figure 22:
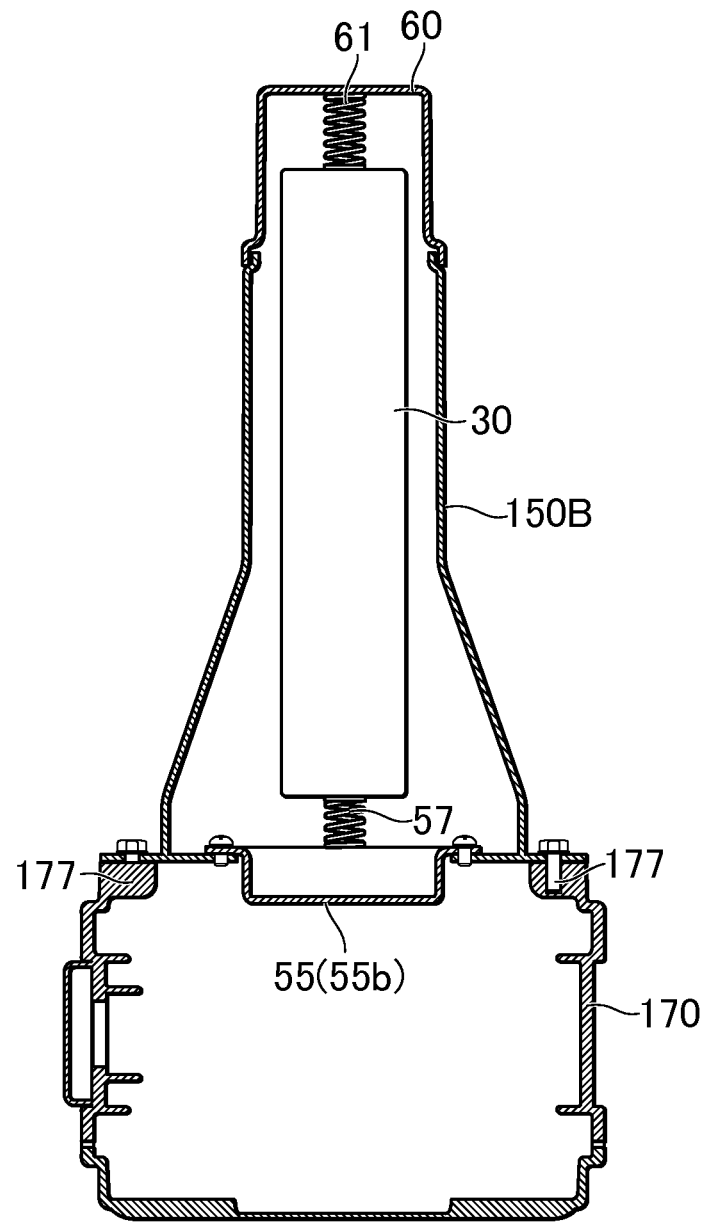
FIG. 22 is a view illustrating a modification example of the battery case and the motor case.

The plurality of batteries 30 may not be necessarily disposed in the battery case 50. FIG. 22 is a cross-sectional view illustrating a battery case 150B configured to accommodate one battery 30. Similar to the example illustrated in FIGS. 17A and 17B, the battery case 150B and the motor case 170 illustrated in FIG. 22 are separate. The motor case 170 is vertically fixed to the battery case 150B using the tightening members 177. Even in the example illustrated in FIG. 22, the upper edge 170b of the motor case 170 extends along a lower edge of the battery case 150B in the front-rear direction, and is fixed to the lower edge of the battery case 150B using the tightening members 177.

The battery accommodating portion configured to accommodate the battery 30 may not be necessarily the battery case 50 that defines a portion of the frame. In this example, the battery 30 may be disposed between right and left frames which are disposed on right and left sides of the battery 30 and extend in the front-rear direction, respectively. In this example, the battery 30 may be disposed on a support portion supported by the right and left frames or the motor case 170.

The connector 71 may be disposed farther rearward than the electric motor 21. In this example, the motor control unit 29 may be disposed rearward of the electric motor 21.

The battery 30 may not be necessarily interposed between the upper spring 61 and the lower spring 57. For example, only the lower spring 57 may be provided to support the lower surface of the battery 30. The battery 30 may not be necessarily attached and detached with respect to the vehicle body in the vertical direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle-type electric vehicle comprising:
an electric motor configured to drive a drive wheel;
a battery configured to be attached to, and detached from, the vehicle and to supply electrical power to the electric motor;
a connector provided on the battery;
an elastic member configured to support the battery; and
a connector on the vehicle configured to be electrically connected to the connector on the battery; wherein
the connector on the vehicle is configured to be switched between an unlock state in which movement of the connector on the vehicle follows oscillations of the battery during travelling of the vehicle, and a lock state in which the movement of the connector on the vehicle is restricted.

2. The saddle-type electric vehicle according to claim 1, further comprising a user-operable operation member configured to switch the connector on the vehicle between the unlock state and the lock state.

3. The saddle-type electric vehicle according to of claim 2, wherein the operation member is located higher on the vehicle than the battery.

4. The saddle-type electric vehicle according to claim 3, wherein the operation member includes a cover configured to cover the battery, and to be opened and closed.

5. The saddle-type electric vehicle according to claim 4, wherein the first position of the operation member is a closed position of the cover, and the second position of the operation member is an open position of the cover.

6. The saddle-type electric vehicle according to claim 2, wherein the operation member is configured to move between a first position and a second position; and
the vehicle includes a transmission mechanism configured to transmit movement of the operation member to the connector on the vehicle, to bring the connector on the vehicle into the unlock state when the operation member is located at the first position, and to bring the connector on the vehicle into the lock state when the operation member is located at the second position.

7. The saddle-type electric vehicle according to claim 6, wherein the transmission mechanism includes a lock member configured to move between an engaging position at which the lock member engages with the connector on the vehicle and the connector on the vehicle is brought into the lock state, and a release position at which the lock member separates from the connector on the vehicle and the connector on the vehicle is brought into the unlock state; and
the operation member and the lock member are connected to each other, the lock member is disposed at the release position when the operation member is located at the first position, and the lock member is disposed at the engaging position when the operation member is located at the second position.

8. The saddle-type electric vehicle according to claim 6, wherein the battery includes a plurality of batteries;
the connector on the vehicle includes a plurality of connectors respectively connected to the connectors on the plurality of batteries; and
the transmission mechanism is configured to limit the movement of the plurality of connectors on the vehicle when the operation member is located at the second position, and to allow the movement of the plurality of connectors on the vehicle when the operation member is located at the first position.

9. The saddle-type electric vehicle according to claim 1, wherein the battery is configured to be vertically attached to, and detached from, the vehicle;
the vehicle includes a battery accommodating portion including a bottom portion on which the battery is disposed; and
the elastic member and the connector on the vehicle are provided in the bottom portion.

10. The saddle-type electric vehicle according to claim 1, wherein the battery is configured to be attached to, and detached from, the vehicle in a first direction; and
one of the connector on the vehicle and the connector on the battery includes an engaging member configured to move between an engaging position at which the engaging member engages with the other of the connector on the vehicle and the connector on the battery so that the engaging member prevents separation of the battery from the connector on the vehicle in the first direction, and a release position at which the engaging member releases the other of the connector on the vehicle and the connector on the battery so that the battery is allowed to separate from the connector on the vehicle in the first direction.

11. The saddle-type electric vehicle according to claim 10, wherein the engaging member is configured to move while connected with an operation member configured to attach and detach the battery from the vehicle by an operator.

12. The saddle-type electric vehicle according to claim 11, wherein the operation member is a carrying handle of the battery.

* * * * *